United States Patent
Alvo et al.

(10) Patent No.: US 10,769,708 B2
(45) Date of Patent: Sep. 8, 2020

(54) CONSUMABLE USAGE SENSORS AND APPLICATIONS TO FACILITATE AUTOMATED REPLENISHMENT OF CONSUMABLES VIA AN ADAPTIVE DISTRIBUTION PLATFORM

(71) Applicant: OrderGroove, Inc., New York, NY (US)

(72) Inventors: Greg E. Alvo, Brooklyn, NY (US); Paul Frederich, Brooklyn, NY (US); Michael Bifolco, Irvington, NY (US); Ofir Shalom, Jersey City, NJ (US); Juan Gutierrez, Hinesburg, VT (US); Marcos Moyano, Rosario (AR); Bradley Williams Groff, Brooklyn, NY (US)

(73) Assignee: OrderGroove, Inc., New York, NY (US)

( * ) Notice: Subject to any disclaimer, the term of this patent is extended or adjusted under 35 U.S.C. 154(b) by 262 days.

(21) Appl. No.: 15/801,172

(22) Filed: Nov. 1, 2017

(65) Prior Publication Data

US 2018/0349980 A1    Dec. 6, 2018

Related U.S. Application Data

(63) Continuation-in-part of application No. 15/479,230, filed on Apr. 4, 2017.

(Continued)

(51) Int. Cl.
*G06Q 30/06* (2012.01)
*G06F 3/16* (2006.01)
(Continued)

(52) U.S. Cl.
CPC ......... *G06Q 30/0633* (2013.01); *G06F 3/167* (2013.01); *G06Q 10/04* (2013.01);
(Continued)

(58) Field of Classification Search
CPC .............................. G06Q 10/08; G06Q 20/208
See application file for complete search history.

(56) References Cited

U.S. PATENT DOCUMENTS 4,814,996 A    3/1989   Wang
4,869,266 A *  9/1989   Taylor ..................... A61M 1/00
                                                        600/587

(Continued)

FOREIGN PATENT DOCUMENTS

AU    8694301 A      3/2002
WO    2019089480 A2  5/2019

OTHER PUBLICATIONS

Fredrich et al., "Dynamic Processing of Electronic Messaging Data and Protocols to Automatically Generate Location Predictive Retrieval Using a Networked, Multi-Stack Computing Environment," U.S. Appl. No. 16/046,690, filed Jul. 26, 2018.

(Continued)

*Primary Examiner* — A. Hunter Wilder
(74) *Attorney, Agent, or Firm* — Kokka & Backus, PC

(57) ABSTRACT

Various embodiments relate generally to data science and data analysis, computer software and systems, and control systems to provide a platform to facilitate implementation of an interface and one or more sensors, and, more specifically, to one or more sensors that implements specialized logic to facilitate in-situ monitoring of inventories of consumables and automatic reordering of a consumable. In some examples, a method may include receiving sensor data representing usage of a device configured to process a consumable, characterizing the usage to form a character- (Continued)

ized value, correlating data representing a unit of the consumable processed via the device to a characterized value of the usage, adjusting an amount representing an inventory of the consumable, detecting an amount of the inventory of the consumable is associated with one or more ranges of threshold values, and generating data representing a request to replenish the inventory of the consumable.

18 Claims, 15 Drawing Sheets

Related U.S. Application Data

(60) Provisional application No. 62/579,871, filed on Oct. 31, 2017, provisional application No. 62/579,872, filed on Oct. 31, 2017, provisional application No. 62/425,191, filed on Nov. 22, 2016.

(51) Int. Cl.
  *G06Q 10/08* (2012.01)
  *G06Q 10/04* (2012.01)
  *G06Q 30/02* (2012.01)
  *G06Q 20/20* (2012.01)

(52) U.S. Cl.
  CPC ....... *G06Q 10/087* (2013.01); *G06Q 30/0202* (2013.01); *G06Q 10/08* (2013.01); *G06Q 20/208* (2013.01)

(56) References Cited

U.S. PATENT DOCUMENTS

| | | |
|---|---|---|
| 5,090,734 A | 2/1992 | Dyer et al. |
| 6,204,763 B1 | 3/2001 | Sone |
| 6,415,262 B1 | 7/2002 | Walker et al. |
| 6,963,848 B1 | 11/2005 | Brinkerhoff |
| 7,251,617 B1 | 7/2007 | Walker et al. |
| 7,295,990 B1 | 11/2007 | Braumoeller et al. |
| 7,340,414 B2 | 3/2008 | Roh et al. |
| 7,540,767 B1 | 6/2009 | Czarnecki |
| 7,552,068 B1 | 6/2009 | Brinkerhoff |
| 7,747,543 B1 | 6/2010 | Braumoeller et al. |
| 7,953,645 B2 | 5/2011 | Kerker et al. |
| 8,121,876 B1 | 2/2012 | Braumoeller et al. |
| 8,126,784 B1 | 2/2012 | Agarwal |
| 8,353,448 B1 | 1/2013 | Miller et al. |
| 8,370,271 B1 | 2/2013 | Robinson et al. |
| 8,417,639 B1 | 4/2013 | Baram |
| 8,428,988 B1 | 4/2013 | Braumoeller et al. |
| 8,458,051 B1 | 6/2013 | Saltzman et al. |
| 8,498,888 B1 | 7/2013 | Raff et al. |
| 8,620,707 B1 | 12/2013 | Belyi et al. |
| 8,818,836 B1 | 8/2014 | Braumoeller et al. |
| 8,867,401 B1 | 10/2014 | Tomay et al. |
| 8,924,262 B2 | 12/2014 | Shuster |
| 9,047,607 B1 | 6/2015 | Curial et al. |
| 9,134,675 B2 | 9/2015 | Yang et al. |
| 9,659,310 B1 | 5/2017 | Allen et al. |
| 9,792,643 B1 | 10/2017 | Masterman |
| 9,886,810 B1 | 2/2018 | Murphy |
| 9,959,565 B2 | 5/2018 | Shuster |
| 10,262,294 B1* | 4/2019 | Hahn .................. H03K 17/962 |
| 10,275,740 B2 | 4/2019 | Alvo et al. |
| 10,332,067 B2 | 6/2019 | Sirisilla et al. |
| 10,360,617 B2 | 7/2019 | High et al. |
| 10,445,751 B2 | 10/2019 | Nakano et al. |
| 10,586,266 B2 | 3/2020 | Fredrich et al. |
| 2002/0161652 A1 | 10/2002 | Paullin et al. |
| 2002/0161670 A1 | 10/2002 | Walker et al. |
| 2003/0004784 A1 | 1/2003 | Li et al. |
| 2003/0110103 A1 | 6/2003 | Sesek et al. |
| 2003/0195788 A1 | 10/2003 | Loeb et al. |
| 2003/0212614 A1 | 11/2003 | Chu et al. |
| 2004/0111326 A1 | 6/2004 | Rock et al. |
| 2004/0162880 A1 | 8/2004 | Arnone et al. |
| 2005/0150951 A1 | 7/2005 | Sacco et al. |
| 2005/0165656 A1 | 7/2005 | Frederick et al. |
| 2008/0015951 A1 | 1/2008 | Kerker et al. |
| 2008/0071626 A1 | 3/2008 | Hill |
| 2009/0024801 A1 | 1/2009 | Choi et al. |
| 2009/0094121 A1 | 4/2009 | Newhouse et al. |
| 2010/0102082 A1 | 4/2010 | Ebrom et al. |
| 2010/0217450 A1 | 8/2010 | Beal et al. |
| 2010/0280960 A1 | 11/2010 | Ziotopoulos et al. |
| 2011/0032070 A1 | 2/2011 | Bleile |
| 2011/0054935 A1 | 3/2011 | Hardaway |
| 2011/0251807 A1 | 10/2011 | Rada et al. |
| 2011/0258072 A1 | 10/2011 | Kerker et al. |
| 2012/0004977 A1 | 1/2012 | Daniels, Jr. et al. |
| 2012/0036045 A1 | 2/2012 | Lowe et al. |
| 2012/0124859 A1 | 5/2012 | May et al. |
| 2012/0150461 A1 | 6/2012 | Ohiwa et al. |
| 2012/0150677 A1 | 6/2012 | Shuster |
| 2013/0041605 A1 | 2/2013 | Ting et al. |
| 2013/0080968 A1 | 3/2013 | Hanson et al. |
| 2013/0117053 A2 | 5/2013 | Campbell |
| 2013/0128396 A1 | 5/2013 | Danesh et al. |
| 2013/0159454 A1 | 6/2013 | Hunter et al. |
| 2013/0268315 A1 | 10/2013 | Cotton et al. |
| 2014/0012706 A1 | 1/2014 | Foerster |
| 2014/0191573 A1 | 7/2014 | Chen et al. |
| 2014/0258165 A1 | 9/2014 | Heil |
| 2014/0279208 A1 | 9/2014 | Nickitas et al. |
| 2014/0279215 A1 | 9/2014 | Alvo et al. |
| 2014/0279291 A1 | 9/2014 | Brosnan et al. |
| 2014/0297487 A1* | 10/2014 | Bashkin ............... G06Q 10/087 |
| | | 705/28 |
| 2014/0304026 A1 | 10/2014 | Delaney et al. |
| 2015/0019342 A1 | 1/2015 | Gupta |
| 2015/0105880 A1 | 4/2015 | Slupik et al. |
| 2015/0106228 A1 | 4/2015 | Shuster |
| 2015/0106238 A1 | 4/2015 | Shuster |
| 2015/0112826 A1 | 4/2015 | Crutchfield, Jr. |
| 2015/0127421 A1 | 5/2015 | Nakano et al. |
| 2015/0178654 A1* | 6/2015 | Glasgow .......... G06Q 10/06315 |
| | | 705/7.25 |
| 2015/0261644 A1 | 9/2015 | Zhang et al. |
| 2015/0302510 A1 | 10/2015 | Godsey et al. |
| 2015/0363866 A1 | 12/2015 | Depew |
| 2015/0363867 A1 | 12/2015 | Tipton et al. |
| 2016/0034024 A1 | 2/2016 | Mergen |
| 2016/0148149 A1 | 5/2016 | Suddamalla et al. |
| 2016/0218884 A1 | 7/2016 | Ebrom et al. |
| 2016/0231792 A1 | 8/2016 | Richter et al. |
| 2016/0275424 A1 | 9/2016 | Concannon et al. |
| 2016/0275530 A1 | 9/2016 | Concannon et al. |
| 2016/0314514 A1 | 10/2016 | High et al. |
| 2016/0356641 A1 | 12/2016 | Larson |
| 2016/0371762 A1 | 12/2016 | Fergis et al. |
| 2017/0011304 A1 | 1/2017 | Shimizu |
| 2017/0019266 A1 | 1/2017 | Lim et al. |
| 2017/0032101 A1 | 2/2017 | Skoda |
| 2017/0134182 A1 | 5/2017 | Davis et al. |
| 2017/0300984 A1 | 10/2017 | Hurwich |
| 2018/0005173 A1 | 1/2018 | Elazary et al. |
| 2018/0031616 A1 | 2/2018 | Hansen et al. |
| 2018/0082038 A1 | 3/2018 | Blair et al. |
| 2018/0131658 A1 | 5/2018 | Bhagwan et al. |
| 2018/0144290 A1 | 5/2018 | Alvo et al. |
| 2018/0144389 A1 | 5/2018 | Fredrich et al. |
| 2018/0204256 A1 | 7/2018 | Bifolco et al. |
| 2018/0253952 A1 | 9/2018 | Huang |
| 2018/0285809 A1 | 10/2018 | Fredrich et al. |
| 2018/0315111 A1 | 11/2018 | Alvo et al. |
| 2018/0322447 A1 | 11/2018 | Cantrell |
| 2018/0336512 A1 | 11/2018 | Clarke et al. |
| 2018/0365753 A1 | 12/2018 | Fredrich et al. |
| 2019/0066183 A1 | 2/2019 | Fredrich et al. |
| 2019/0073627 A1* | 3/2019 | Nakdimon .......... G06K 7/10425 |
| 2019/0087769 A9* | 3/2019 | Glasgow ............. G06Q 10/087 |
| 2019/0295148 A1 | 9/2019 | Lefkow et al. |

(56) References Cited

U.S. PATENT DOCUMENTS

2019/0295150 A1 9/2019 High et al.
2019/0392378 A1 12/2019 Alvo et al.
2020/0104903 A1 4/2020 Alvo et al.

OTHER PUBLICATIONS

Fredrich et al., "Dynamic Processing of Electronic Messaging Data and Protocols to Automatically Generate Location Predictive Retrieval Using a Networked, Multi-Stack Computing Environment," U.S. Appl. No. 16/115,474, filed Aug. 28, 2018.
Alvo et al., "Consumable Usage Sensors and Applications to Facilitate Automated Replenishment of Consumables Via an Adaptive Distribution Platform," U.S. Appl. No. 62/579,871, filed Dec. 31, 2017.
Alvo et al., "Consumable Usage Sensors and Applications to Facilitate Automated Replenishment of Consumables Via an Adaptive Distribution Platform," U.S. Appl. No. 15/801,002, filed Nov. 1, 2017.
Alvo et al., "Consumable Usage Sensors and Applications to Facilitate Automated Replenishment of Consumables Via an Adaptive Distribution Platform," U.S. Appl. No. 62/579,872.
Alvo et al., "Sensors and Executable Instructions to Compute Consumable Usage to Automate Replenishment or Service of Consumables Via an Adaptive Distribution Platform," U.S. Appl. No. 15/905,764, filed Feb. 26, 2018.
Bifolco et al., "Adaptive Scheduling to Facilitate Optimized Distribution of Subscribed Items," U.S. Appl. No. 15/821,362, filed Nov. 22, 2017.
Mahone, Kristie A., Non-Final Office Action for U.S. Appl. No. 15/801,002 dated Mar. 8, 2018.
"WeMo Insight Smart Plug, F7CO29 Frequently Asked Questions", Belkin Knowledge Article, retrieved Nov. 9, 2017, http://www.belkin.com/us/support-article?articleNum=80139.
"Belkin WeMo Insight Switch", Belkin Instruction Manual, Part# 8830uk17750/SKU: F7CO29uk, Oct. 23, 2014, http://www.free-instruction-manuals.com/pdf/pa_1184191.pdf.
Stinson, Tanner, "AmazonKitchen DRS", Hackster Project, Published Feb. 5, 2017, https://www.hackster.io/tanner-stinson/amazonkitchen-drs-75fc24?ref=challenge&ref_id=78&offset=9 .
Bargeon, Brittany E., U.S. Patent and Trademark Office Non-Final Office Action dated Aug. 14, 2014 for U.S. Appl. No. 13/962,213 (21 pages).
Bargeon, Brittany E., U.S. Patent and Trademark Office Final Office Action dated Oct. 23, 2015 for U.S. Appl. No. 13/962,213 (24 pages).
Bargeon, Brittany E., U.S. Patent and Trademark Office Non-Final Office Action dated Jun. 9, 2016 for U.S. Appl. No. 13/962,213 (26 pages).
Bargeon, Brittany E., U.S. Patent and Trademark Office Non-Final Office Action dated Nov. 18, 2016 for U.S. Appl. No. 13/962,213 (22 pages).
Alvo, Greg, "Automated Method and System for Converting One-Time Buyers of a Product/Service Into Recurring Subscribers", U.S. Appl. No. 61/791,873, filed Mar. 15, 2013.
Bifolco et al., "Adaptive Scheduling to Facilitate Optimized Distribution of Subscribed Items", U.S. Appl. No. 62/425,191, filed Nov. 22, 2016.
Fredrich et al., "Electronic Messaging to Distribute Items Based on Adaptive Scheduling", U.S. Appl. No. 15/479,230, filed Apr. 4, 2017.
Fredrich et al., "Adaptive Scheduling of Electronic Messaging Based on Predictive Consumption of the Sampling of Items Via a Networked Computing Platform", U.S. Appl. No. 15/716,486, filed Sep. 26, 2017.
Mahone, Kristie A., Final Office Action for U.S. Appl. No. 15/801,002 dated Sep. 28, 2018.
Zimmerman, Jeffrey P., Non-Final Office Action for U.S. Appl. No. 16/046,690 dated Dec. 10, 2018.
Zimmerman, Jeffrey P., Non-Final Office Action for U.S. Appl. No. 16/115,474 dated Dec. 6, 2018.
Alvo et al., Consumable Usage Sensors and Applications to Facilitate Automated Replenishment of Consumables Via an Adaptive Distribution Platform, U.S. Appl. No. 16/398,241, filed Apr. 29, 2019.
Amazon, "Order a Subscribe & Save Subscription," archived back at least as far as Oct. 2014, accessed Jul. 10, 2019 at https://web.archive.org/web/20141009140840/http://www.amazon.com/gp/help/customer/display.html? nodeId=201125870.
Anonymous, Amazon.com Launches Magazines Store; Customers Can Now Purchase Magazine Subscriptions for Themselves or as Gifts on Amazon.com, Oct. 30, 2001, Business Water, pp. 1-2. (Year: 2001).
Bargeon, Brittany E., Notice of Allowance and Fee(s) Due for U.S. Appl. No. 13/962,213 dated Jul. 25, 2019.
CTIA's Annual Survey Says US Wireless Providers Handled 3.2 Trillion Megabytes of Data Traffic in 2013 for a 120 Percent Increase Over 2012, Jun. 17, 2014, https://web.archive.org/web/20140723023447/http://www.ctia.org/resource-library/press-releases/archive/ctia-annual-survey-2013.
Kim, Harry C., Notification of Transmittal of the International Search Report and the Written Opinion of the International Searching Authority, or the Declaration for International Application No. PCT/US2018/058053 dated May 7, 2019.
Mitchell, Nathan A., Notice of Allowance and Fee(s) Due dated Mar. 1, 2019 for U.S. Appl. No. 15/801,002.
Rao, Leena, "Amazon to Add Trash Cans, Dishwashers, Dryers to Smart Reordering Service." Published Aug. 2016. Retrieved from on Feb. 22, 2019.
Ricker, Thomas; "Wanted: An Amazon Fridge That Automatically Reorders Food." Published Jan. 2017. Retrieved from on Feb. 22, 2019.
Zimmerman, Jeffrey P., Final Office Action dated Apr. 15, 2019 for U.S. Appl. No. 16/046,690.
Zimmerman, Jeffrey P., Final Office Action dated Apr. 15, 2019 for U.S. Appl. No. 16/115,474.
Zimmerman, Jeffrey P., Non-Final Office Action dated Jul. 15, 2019 for U.S. Appl. No. 16/115,474.
Zimmerman, Jeffrey P., Non-Final Office Action dated Jun. 20, 2019 for U.S. Appl. No. 15/479,230.
Zimmerman, Jeffrey P., Non-Final Office Action dated Jun. 20, 2019 for U.S. Appl. No. 16/046,690.
Eskridge, Cory W., Final Office Action dated Feb. 21, 2020 for U.S. Appl. No. 15/479,230.
Garg, Yogesh C., Non-Final Office Action dated Nov. 12, 2019 for U.S. Appl. No. 15/821,362.
Koester, Michael Richard, Non-Final Office Action dated Nov. 25, 2019 for U.S. Appl. No. 15/716,486.
Mitchell, Nathan A., Non-Final Office Action for U.S. Appl. No. 15/905,764 dated Mar. 18, 2020.
Ricker, Thomas; "Wanted: An Amazon Fridge That Automatically Reorders Food," Published Jan. 18, 2017; Retrieved From on Mar. 18, 2020.

* cited by examiner

CONSUMABLE USAGE SENSORS AND APPLICATIONS TO FACILITATE AUTOMATED REPLENISHMENT OF CONSUMABLES VIA AN ADAPTIVE DISTRIBUTION PLATFORM

CROSS-REFERENCE TO APPLICATIONS

This application claims the benefit of U.S. Provisional Patent Application No. 62/579,871, filed on Oct. 31, 2017, and titled "Consumable Usage Sensors and Applications to Facilitate Automated Replenishment of Consumables Via An Adaptive Distribution Platform"; This application also claims the benefit of U.S. Provisional Patent Application No. 62/579,872, filed on Oct. 31, 2017, and titled "Consumable Usage Sensors and Applications to Facilitate Automated Replenishment of Consumables Via An Adaptive Distribution Platform"; This application is also a continuation-in-part ("CIP") application of U.S. patent application Ser. No. 15/479,230, filed on Apr. 4, 2017, and titled "Electronic Messaging to Distribute Items Based on Adaptive Scheduling," all of which is herein incorporated by reference in their entirety for all purposes. This application also incorporates by reference U.S. Provisional Patent Application No. 62/425,191, filed on Nov. 22, 2016, and titled "Adaptive Scheduling to Facilitate Optimized Distribution of Subscribed Items."

FIELD

Various embodiments relate generally to data science and data analysis, computer software and systems, and control systems to provide a platform to facilitate implementation of an interface and one or more sensors, and, more specifically, to one or more sensors and/or computing algorithms that implement specialized logic to facilitate in-situ monitoring of inventories of consumables for automated replenishment of a consumable. In at least one example, one or more sensors and/or computing algorithms facilitate formation of an automated home inventory replenishment network.

BACKGROUND

Advances in computing hardware and software, as well as computing networks and network services, have bolstered growth of Internet-based product and service procurement and delivery. For example, online shopping, in turn, has fostered the use of "subscription"-based delivery computing services with an aim to provide convenience to consumers. In particular, a user becomes a subscriber when associated with a subscriber account, which is typically implemented on a remote server for a particular seller. In exchange for electronic payment, which is typically performed automatically, a seller ships a specific product (or provides access to a certain service) at periodic times, such as every three (3) months, every two (2) weeks, etc., or any other repeated periodic time intervals. With conventional online subscription-based ordering, consumers need not plan to reorder to replenish supplies of a product.

But conventional approaches to provide subscription-based order fulfillment, while functional, suffer a number of other drawbacks. For example, traditional subscription-based ordering relies on computing architectures that predominantly generate digital "shopping cart" interfaces with which to order and reorder products and services. Traditional subscription-based ordering via shopping cart interfaces generally rely on a user to manually determine a quantity and a time period between replenishing shipments, after which the quantity is shipped after each time period elapses. Essentially, subscribers receive products and services on "auto-pilot."

Unfortunately, conventional approaches to reordering or procuring subsequent product and services deliveries are plagued by various degrees of rigidity that interject sufficient friction into reordering that cause some users to either delay or skip making such purchases. Such friction causes some users to supplement the periodic deliveries manually if an item is discovered to be running low more quickly than otherwise might be the case (e.g., depleting coffee, toothpaste, detergent, wine, or any other product more quickly than normal).

Examples of such friction include "mental friction" that may induce stress and frustration in such processes. Typically, a user may be required to rely on one's own memory to supplement depletion of a product and services prior to a next delivery (e.g., remembering to buy coffee before running out) or time of next service. Examples of such friction include "physical friction," such as weighing expending time and effort to either physically confront a gauntlet of lengthy check-out and shopping cart processes, or to make an unscheduled stop at a physical store.

Thus, what is needed is a solution to facilitate techniques of determining usage of a consumable and monitoring an inventory of the consumable for purposes of replenishment, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
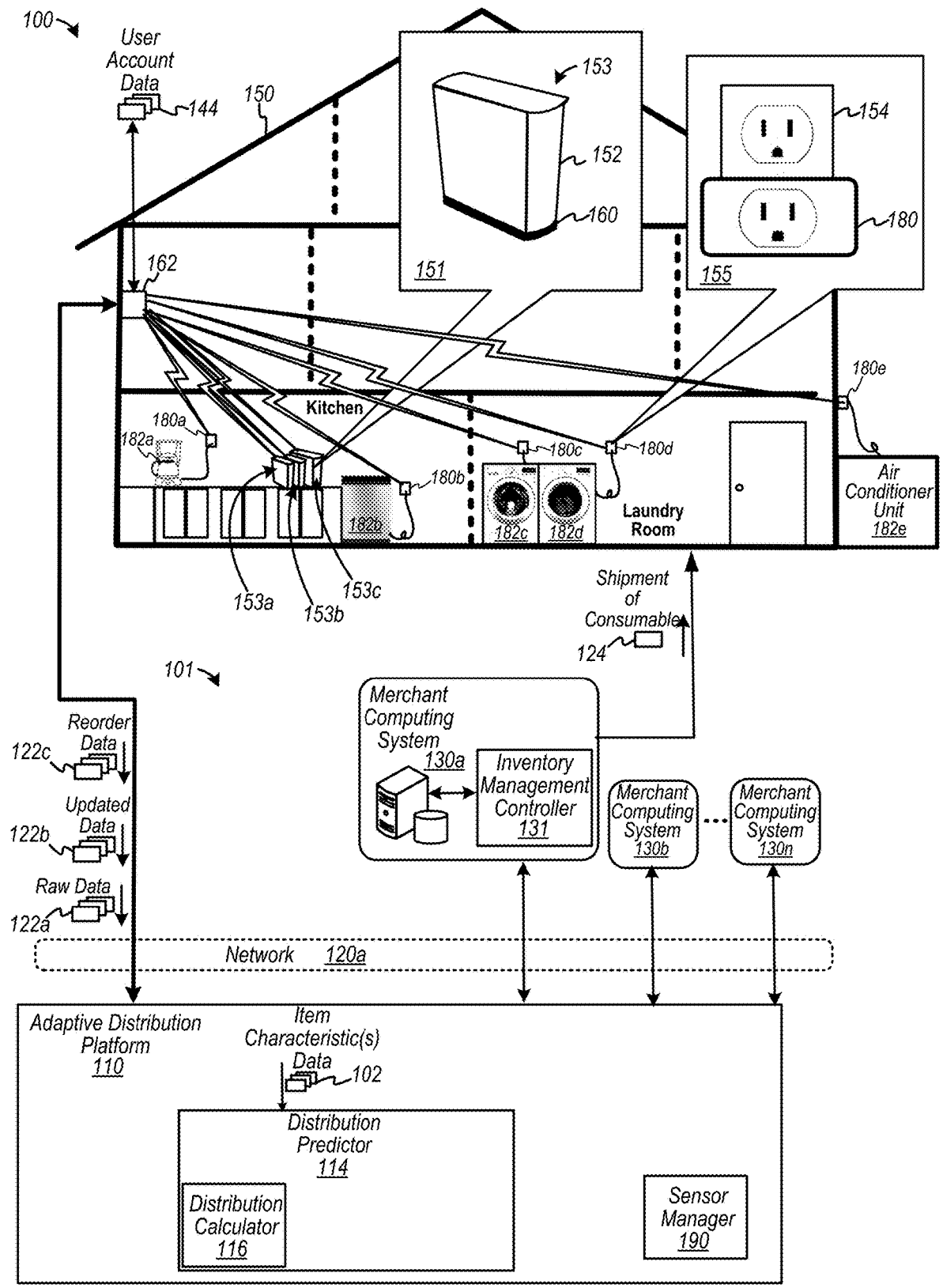
FIG. 1 is a diagram depicting one or more usage sensors configured to interact with an adaptive distribution platform, according to some embodiments.

FIG. 1 is a diagram depicting one or more usage sensors configured to interact with an adaptive distribution platform, according to some embodiments. Sensors, such as sensors 160 and 180, may be implemented to monitor usage in-situ of, for example, electric-powered appliances, whereby usage of an electric-powered appliance or device may correlate to a consumption rate of a consumable, such as coffee, toasted bagels, dish detergent, air filters, etc. Examples of electric-powered devices include a coffee maker, a toaster, a dishwasher, a washer machine, a dryer, an air conditioner, and a hot water kettle, among any other type of electric-powered device. A sensor may also monitor usage of a consumable by detecting, for example, a change in weight, displacement, motion (e.g., including vibrations and intensity), orientation, or the like. In one example, a weight monitoring device may include a sensor to determine changes in weight of a consumable due to usage of a product. Usage of electrical-powered appliances and changes in weight may correlate to an amount of a consumable that may be used or consumed at a point in time (e.g., during operation of a device). Based on a correlated amount of product consumed, a computing device may execute instructions to determine inventories of products, and, when an amount of inventory reaches a specific amount, the computing device may generate notifications to assist in replenishment. For example, a notification (e.g., visually or audio) may be generated to alert a consumer to a state of an inventory, such as whether an inventory is low or whether a consumable ought to be automatically reordered. Or, a computing device may be configured to automatically generate a request to reorder a consumable product. Therefore, a variety of structures and/or functionalities, as described herein, may facilitate automated reordering or replenishment of consumable goods with reduced or negligible efforts by users or consumers to otherwise manually determine inventory quantities of a product or manually reorder such a product.

Diagram 100 depicts an example of adaptive distribution platform 110 that may be configured to facilitate automatic distribution of items in accordance with, for example, an adaptive schedule (e.g., an adaptive shipment schedule). The term "distribution" of an item, which may be any good or service, may include distributing or shipping items based on orders or reorders of the items, such as online orders or a predicted depletion of an item (e.g., a predicted consumption of a product). Thus, adaptive distribution platform 110 may be configured to determine a "predicted distribution event" to replenish a consumable item (e.g., a depletable product) based on a usage rate of the item (e.g., a calculated usage rate, or sensed usage rate determined by sensors 160 and 180). Further, sensor data from sensors 160 and 180 may enhance accuracies of determining a usage rate to more accurately predict or determine a date or time at which to ship a consumable to replenish an inventory amount that, for example, may be nearing exhaustion or depletion. A "usage rate" may be a rate at which a product or service is distributed (e.g., ordered or reordered), consumed, or depleted. Sensors 160 and 180 may facilitate in determining a usage rate (e.g., rate of consumption) for a particular product in which a sensor 160 or a sensor 180 is being used.

In various examples, adaptive distribution platform 110 may perform a variety of computations to determine a usage rate so as to predict delivery of a product when a consumer most likely needs a product. In some examples, adaptive distribution platform 110, as well as techniques to determine a usage rate, may be implemented as set forth in U.S. patent application Ser. No. 15/479,230, filed on Apr. 4, 2017, and titled "Electronic Messaging to Distribute Items Based on Adaptive Scheduling," which is herein incorporated by reference. In at least one example, adaptive distribution platform 110 may be implemented as a platform provided by OrderGroove, Inc., of New York, N.Y., U.S.A.

According to various embodiments, accuracy of a usage rate may be enhanced based on sensor data (from one or more sensors 160 and 180) that may correlate to usage of a consumable item. To illustrate, consider that diagram 100 also depicts a location, such as a residence or building 150, that includes a number of sensors 160 and 180 associated with a user account 144 to determine one or more usage rates for a variety of consumables. In accordance with various embodiments, any number of products that may be ordered online, for example, may be associated with user account 144, and, thus, a geographic location associated with residential building 150.

Sensors 180 may be configured to determine an amount of power consumed via device or appliance that may be correlated to an amount of a consumable that is consumed during operation of a device. As shown within inset 155, sensor 180 may be coupled to a power outlet 154. For example, sensor 180a may detect an amount of power consumed by a coffee maker 182a for determining an amount of coffee consumed, and, for determining a remaining inventory of coffee. Sensor 180b may detect an amount of power consumed by a dishwasher 182b for determining an amount of dish detergent consumed, and a remaining inventory of dish detergent. Sensors 180c and 180d may detect amounts of power consumed by a washer machine 182c and a dryer 182d, respectively, to determine relative amounts of laundry detergent and fabric softener sheets consumed. As another example, sensor 180e may detect amounts of power consumed by an air conditioner 182*e* to determine a consumption rate of one or more air filters.

Sensors 160 may detect a characteristic of a consumable, such as a weight of the consumable, to determine or enhance a usage rate of consumable. As shown within inset 151, a weight monitoring sensor 160 may be integrated with a container 152 to form an inventoriable container 153. For example, inventoriable container 153*a* may be configured to determine a weight of its contents, and thus, an amount of coffee or any other solid or liquid consumable. Inventoriable container 153*b* may be configured to determine a weight of an amount of cereal, whereas inventoriable container 153*c* may be configured to determine a weight of an amount of flour. In some implementations, weight monitoring sensor 180 may be implement without container 152 for use, for example, in a refrigerator to monitor a consumption rate of milk by monitoring a weight of a container of milk.

Sensors 160 and 180, as well as any other sensors, may be used to transmit via a network endpoint 162 (e.g., a router) data representing either a state of inventory for a specific consumable or a request to replenish the consumable. An example of a state of an inventory is a value representing a weight of a consumable at a point in time. As shown, raw data 122*a*, such as raw sensor data, may be transmitted to sensor manager 190 to determine a state of inventory of an item. Raw data 122*a*, at least in some examples, may include raw sensor data, such as one or more values representing electrical energy used per unit time, such as in units of watts or kilowatts ("kWs"). Sensor manager 190 may also receive updated data 122*b* that describes a state or change of unit of consumption or a weight, among other things. Thus, updated data 122*b* may include data representing a weight of a consumable, which sensor manager 190 may monitor to determine whether to replenish the inventory at location 150. Otherwise, adaptive distribution platform 110 may receive reorder data 122*c* to invoke replenishment of an item, such as a bag of coffee beans.

In view of the foregoing, the structures and/or functionalities depicted in FIG. 1 may illustrate an example of usage rate determination to automatically facilitate in-situ inventory monitoring of consumables and automated replenishment and distribution of items (e.g., shipping an item) that is ordered or reordered in accordance with various embodiments. According to some embodiments, adaptive distribution platform 110 may be configured to facilitate online ordering and shipment of a product responsive to sensor data retrieved from sensors 160, 180, or any other sensor. Real-time (or near real-time) consumption amounts or rate may be determined for items being monitored by sensors 160, 180, and the like, thereby improving accuracy in determining shipment quantities and timing, among other things, according to various examples. Thus, consumption of resources and time for both users and merchant, as well as associated computing systems, may be reduced such that "friction" of replenishment may be reduced or negated (e.g., based on sensor data from sensors 160 and 180), at least in some cases. In some examples, adaptive distribution platform 110 may provide replenishment services for multiple entities (e.g., for multiple merchant computing systems 130), thereby reducing resources that otherwise may be needed to perform replenishment services individually at each merchant computing system 130*a*, 130*b*, and 130*n*. In some cases, in-situ inventory monitoring may obviate a need to perform a step of monitoring that may otherwise encumber usage of a consumable.

In the example shown, adaptive distribution platform 110 may include a distribution predictor 114, among other components. Distribution predictor 114 may be configured to predict a point in time (or a range of time) at which an item may be exhausted. Based on the prediction, adaptive distribution platform 110 may be further configured to determine a zone of time or a time interval (not shown) in which depletion and near exhaustion of an item may be predicted. In at least one example, sensor-based data 122 received from any number of sensors 160 and 180 may determine a point in time at which to replenish an inventory. In some examples, sensor-based data 122 may enhance accuracy of predicting or calculating a point in time at which an inventory may be depleted.

As shown, adaptive distribution platform 110 may be configured to facilitate "adaptive" scheduling services via a computing system platform for multiple online or Internet-based retailers and service providers, both of which may be referred to as merchants. In some cases, scheduling of consumable shipments to replenish inventories may be "adapted" based on sensor data and corresponding measured usage rates (e.g., a coffee maker may be idle while a user spends a month traveling overseas, whereby sensed usage may essentially be zero during that time). Further to the example shown in diagram 100, a merchant may be associated with a corresponding one of merchant computing systems 130*a*, 130*b*, or 130*n* that includes one or more computing devices (e.g., processors, servers, etc.), one or more memory storage devices (e.g., databases, data stores, etc.), and one or more applications (e.g., executable instructions for performing specialized algorithms to implement adaptive subscription services, etc.). Examples of merchant computing systems 130*a*, 130*b*, or 130*n* may be implemented by any other online merchant. Accordingly, adaptive distribution platform 110 can be configured to distribute items in accordance with predicted distribution events (e.g., a predicted time of distribution), any of which may be adaptively derived to optimize delivery of items based on sensor data from sensors 160, 180, and the like. According to some examples, one or more of merchant computing systems 130*a*, 130*b*, or 130*n* may implement an inventory management controller 131 to manage an amount of inventory for purposes of enhancing the efficacy of fulfilling and replenishing items over an aggregate number of consumers in, for example, an automated manner In some cases, a merchant entity (e.g., a warehouse from which products are shipped) associated with merchant computing system 130*a* may fulfill inventory replenishment by shipping a consumable in shipment container 124.

As shown, distribution predictor 114 may include a distribution calculator 116, among other components. Distribution calculator 116 may be configured to calculate one or more predicted distribution events or replenishment-related data to form an adaptive schedule (e.g., an adaptive shipping schedule) based on sensor data 122*a*, 122*b*, and 122*c* communicated via network 120*a*. Distribution calculator 116 may be configured to receive data representing item characteristics data 102, according to some embodiments, and may be configured further to determine (e.g., identify, calculate, derive, etc.) one or more distribution events based on one or more item characteristics 102, or combinations thereof (e.g., based on derived item characteristics).

For example, distribution calculator 116 may compute a projected date of depletion for a particular product, such as a coffee product, based on usage patterns and/or ordering patterns associated with a specific user account 144, as well sensor data from sensor 180*a*. In at least one example, distribution calculator 116 may be configured to operate on data representing an item characteristic 102, which may be derived or calculated based on one or more other item characteristics 102. Examples of item characteristics data 102 may include, but are not limited to, data representing one or more characteristics describing a product, such as a product classification (e.g., generic product name, such as paper towels), a product type (e.g., a brand name, whether derived from text or a code, such as a SKU, UPC, etc.), a product cost per unit, item data representing a Universal Product Code ("UPC"), item data representing a stock keeping unit ("SKU"), etc., for the same or similar items, or complementary and different items. Item characteristics 102 may also include product descriptions associated with either a SKU or UPC. Based on a UPC for paper towels, for example, item characteristics 102 may include a UPC code number, a manufacture name, a product super-category (e.g., paper towels listed under super-category "Home & Outdoor"), product description (e.g., "paper towels," "two-ply," "large size," etc.), a unit amount (e.g., 12 rolls), etc. Item characteristics 102 also may include any other product characteristic, and may also apply to a service, as well as a service type or any other service characteristic.

In some examples, the various structures and/or functions described herein may facilitate in-situ inventory monitoring and/or automated replenishment of non-consumable items or services. In other examples, any item, material, resource, or product, finished or unfinished, could be replenished using the techniques described herein.

Figure 2:
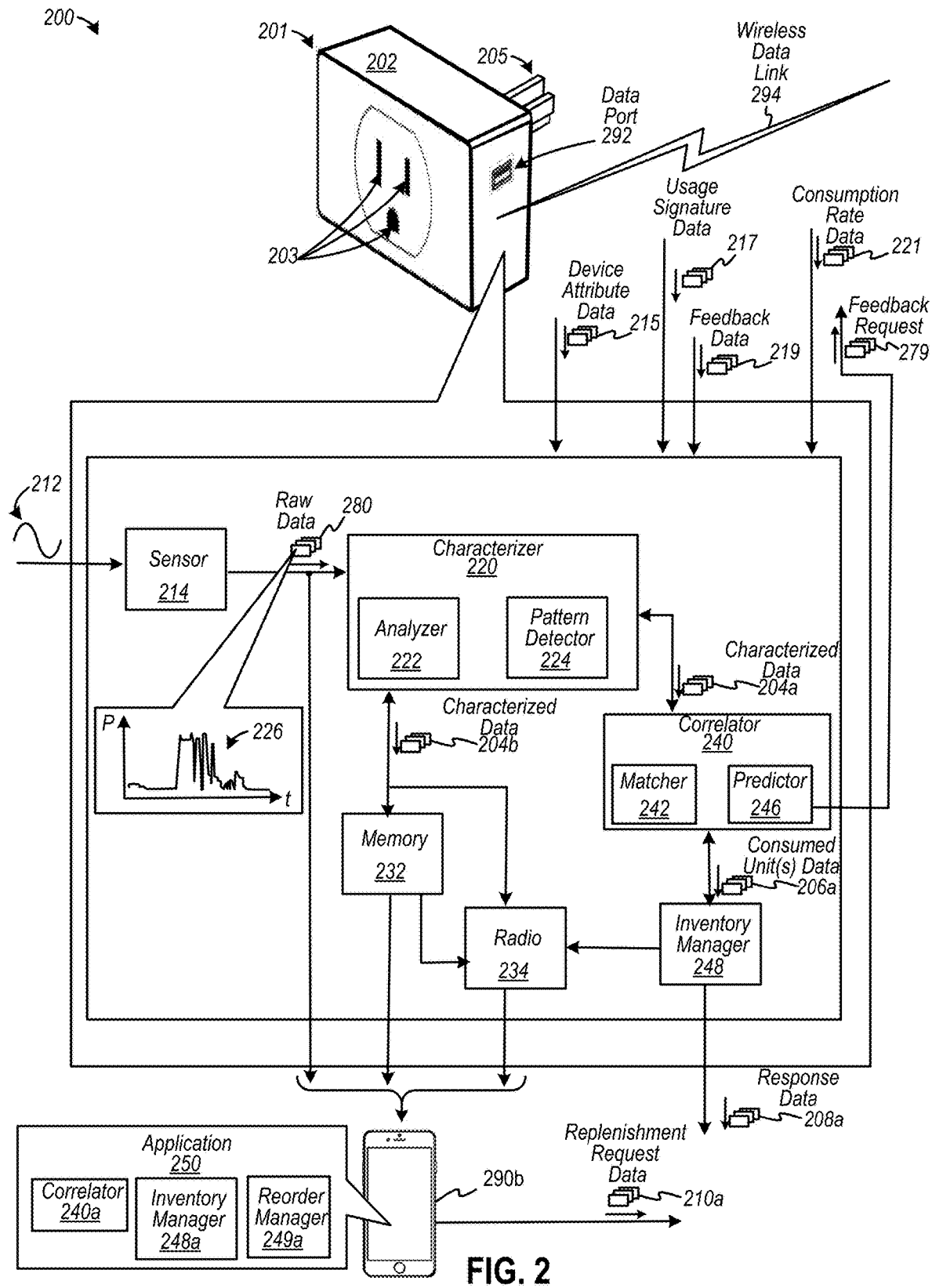
FIG. 2 is a diagram depicting an example of a sensor device configured to detect usage of an electric-powered device to generate data for monitoring inventories of consumables, according to various examples.

FIG. 2 is a diagram depicting an example of a sensor device configured to detect usage of an electric-powered device to generate data for monitoring inventories of consumables, according to various examples. Diagram 200 depicts a sensor device 201 including a housing 202, a subset 203 of conductors configured as a socket-outlet to receive a plug of an electric-powered device (not shown) configured to process a consumable, and a subset 205 of conductors configured to plug into a socket-outlet from which electric power may be accessed. Sensor device 201 optionally may include a data port 292 with which to exchange data, such as sensor data, usage data, consumption data, or the like, via a cable, such as a USB cable (not shown), with a computing device or mobile computing device (e.g., a mobile phone 290b). Sensor device 201 may also include a radio to facilitate radio frequency ("RF")-based communications via a wireless data link 294.

Diagram 200 further depicts one or more components that may be implemented in sensor device 201 including, but not limited to, a sensor 214, a characterizer 220, a correlator 240, a memory 232, a radio 234, and an inventory manager 248. In at least one example, sensor 214 may include a power sensor coupled to subsets 203 and 205 of conductors to detect instantaneous or continuous amounts of electrical energy used by an electric-powered device plugged into subset 203 of conductors. Sensor 214 may receive electrical signals 212 based on either AC or DC power, and may be configured to detect instantaneous or continuous amounts of voltage usage, current usage, or any other electrical-related parameter to monitor power used in the processing of a consumable (e.g., energy used to brew a cup of coffee). Further, sensor 214 may be configured to generate raw sensor data 280 that may exhibit a specific pattern 226 or profile of electric energy usage per unit time. As shown, an electric-powered device may use electrical power at magnitudes ("P") at points of time ("t") during an interval in which a consumable is processed (e.g., a duration in which a washer machine consumes 3 ounces of laundry detergent for a "heavy" load). Note that arrangements of subsets 203 and 205 of conductors are intended to be illustrative and not limiting, and, as such, subsets 203 and 205 of conductors may be arranged in any configuration to adapt to any plug or socket (e.g., European power outlets, DC-powered sockets, etc.). Note, too, that sensor device 201 may be implemented using electro-magnetic phenomena (e.g., as a current-measuring probe).

Characterizer 220 may be configured to characterize usage of a device by characterizing amounts of electrical energy consumed or used per unit time to generate characterize values of electrical energy consumed or used per unit time. As shown, characterizer 220 may include an analyzer 222 and a pattern detector 224. Analyzer 222 may be configured to determine characteristics of pattern 226 to identify a magnitude of power at a particular point in time. Time, t, may be expressed in any unit of time, such as milliseconds, seconds, minutes, etc., and magnitudes of power, P, may be expressed in watts, kilowatts, kilowatt-hours, joules, or any other units of power.

Pattern detector 224 may be configured to form date representing pattern 226 based on amounts of power used by an electrical-powered device, whereby pattern 226 may be used to identify whether an electric-powered device is in use (i.e., whether powered off or powered on to process a consumable), whether the electric-powered device is idle, and the like. Pattern 226 may also be used to determine whether the electric-powered device is drawing different amounts of power during different times of the day. Different amounts of power may be due to using electric power at different magnitudes and/or different lengths of usage. For example, a coffee maker may consume more power to brew 10 cups of coffee than the power used to brew 2 cups of coffee. Thus, pattern 226 of power usage for 10 cups may extend for a longer time, "t," than another pattern of power for 2 cups of coffee. As another example, a longer wash cycle of a washer machine, and increased power consumption, may indicate a "heavy" load of laundry that may process a greater quantity of laundry detergent than a "light" load of laundry. Thus, pattern 226 of power usage for a heavier load of laundry may extend for a longer time, "t."

Characterizer 220 may receive device attribute data 215 and/or usage signature data 217, according to some examples. Device attribute data 215 may include data describing a type of electric-powered device for which sensor device 201 may be configured to monitor. For example, data 215 may include data describing an electric-powered device as a coffee maker, a dishwasher, a toaster, a dryer, a vacuum cleaner, an air conditioner, a furnace, a rice maker, an electric tea kettle, or any other device with which a product may be consumed in associated with the usage of a device. Usage signature data 217 may include data describing any number of patterns 226 for specific types of electric-powered devices, and, optionally, specific power consumption patterns 226 based on unique models or manufacturers of the electric-powered device under one or more different operations (e.g., brewing 2, 4, 6, 8, or 10 cups of coffee may be viewed as different operations of a coffee machine). In one example, coffee makers or espresso machines made by different manufacturers likely have different patterns 226 of power usage, and, thus, unique power usage signatures. In some examples, one or more patterns in usage signature data 217 may also be associated with a corresponding amount of consumable (e.g., a product) that may be associated with a specific usage signature (i.e., a predetermined pattern).

In operation, characterizer 220 may use usage signature data 217 to predict a type of electric-powered device that may be coupled to sensor device 201 in the absence of device attribute data 215 or any indication of the type of device for which power may be monitored. For example, pattern detector 224 may also be configured to detect whether pattern 226, as monitored by sensor 214, matches any known power patterns included in usage signature data 217, which, in turn, may include data describing an associated electric-powered device. Therefore, pattern detector 224 may compare pattern 226 to any number of power usage patterns for coffee makers, espresso machines, washer machines, dishwashers, etc., that may be included in usage signature data 217 to identify a device type coupled to sensor device 201. Also, characterizer 220 may use device attribute data 215 (e.g., indicating an electric-powered device is an espresso machine) to identify a subset of usage signatures in usage signature data 217 (i.e., patterns of power usage for a variety of espresso machines).

Characterizer 220 may generate characterized data that describes, summarizes, or encapsulates one or more of the following: characterized values of power usage (e.g., one or more magnitudes of power per unit time), an indication of a type and/or model of an electric-powered device, a duration of power usage, a time of day of the power usage, etc., whereby the characterized data may be transmitted as characterized data 204a to correlator 240 and, optionally, as characterized data 204b to memory 232 and radio 234. Memory 232 may store one or more cycles or instances of power usage captured by sensor device 201 for further processing or certain times at which the data may be transmitted to, for example, a mobile computing device 290b or any other computing device, including an adaptive distribution platform. Radio 234 may be configured to transmit characterized data 204b via wireless datalink 294 to mobile computing device 290b or any other computing device. Examples of radio 234 include RF transceivers to implement WiFi® protocols, BlueTooth® protocols (including BlueTooth Low Energy), and the like. Sensor device 201 may be associated with an identifier, such as an IP address. Further, radio 234 may be used to include sensor device 201 in a mesh network, and may exchange data via power lines coupled to subset 204 of conductors.

Correlator 240 may be configured to correlate a portion of a product consumed to a characterized value of power usage, whereby one or more units of consumable processed by a device can be determined. For example, correlator 240 may correlate an "X" amount of watts used by a coffee maker (e.g., for 4 minutes) to an amount of coffee used. Units of ground coffee consumed may be expressed volumetrically (e.g., 2 scoops or tablespoons), by unit (e.g., 1 pod of coffee or other pre-package unit of coffee or tea), by weight (e.g., 15 mg), or by any other parameter. Next, consider that a coffee machine may use about 300 to 600 watts to brew 2 cups of coffee and about 1000 to 1500 watts to brew 8 cups of coffee. A first pattern of power usage may be associated with using 300 to 600 watts, whereas a second pattern of power usage may be associated with using 1000 to 1500 watts. These patterns may be included in usage signature data 217. Alternatively, such patterns may be generated from previous usages with sensor device 201 and stored in memory 232. As such, correlator 240 need not rely on usage signature data 217 and may use patterns 226 generated internally within sensor device 201, according to some examples.

Correlator 240 is shown to include a matcher 242 and a predictor 246, according to some examples. Matcher 242 may identify a pattern of values of electric energy used per unit time, and may further match the pattern against data representing units of consumable processed by a device in association with the pattern. Further to the above example, matcher 242 may match a first pattern of 300 to 600 watts to 2 tablespoons of ground coffee or match a second pattern of 1000 to 1500 watts to 8 tablespoons of ground coffee. If pattern 226, which is sensed by sensor 214, matches the second pattern of 1000 to 1500 watts, then matcher 242 may determine 8 tablespoons of ground coffee was used. Thus, matcher 242 may match a sensed pattern of values of electric energy per unit time to data representing a usage signature associated with a device, or to any other associated data that specifies a corresponding one or more units of consumable was processed by the device. Further, matcher 242 may transmit data representing 8 tablespoons of ground coffee as consumed unit(s) data 206a to an inventory manager 248.

Predictor 246 may be configured to predict a value representing one or more units of consumable processed by a device based a sensed pattern of electric energy per unit time. In some examples, predictor 246 may predict an amount of a product consumed based on previously-processed amounts. For example, consider that sensor device 201 has previously sensed a number of patterns 226 associated with brewing 2 cups of coffee (e.g., average of 450 Watts). At a subsequent point in time, a coffee maker is used to brew 6 cups of coffee. Predictor 246 may be configured to approximate an amount of ground coffee used to brew 6 cups of coffee, which may be extrapolated from 450 Watts (for 2 cups) to 800 Watts sensed by sensor 214. Hence, a pattern of 800 watts of usage may predictively correlate to 6 cups of coffee. In some cases, predictor 246 may generate feedback request 279 (e.g., transmitted to mobile computing device 290b) to calibrate whether 6 tablespoons of ground coffee were used in the brewing process. As such, feedback data 219 may be used confirm the predicted amounts of product consumed, or to recalibrate the predicted amount for subsequent uses. In at least one example, data representing a consumption rate 221 may be provided to correlator 240 to confirm one or more rates of consumption that may be used for a particular electric-powered device. Continuing with the coffee maker example, consider that a user desires stronger coffee and prefers a greater amount of ground coffee to be used in a coffee maker. Thus, consumption rate 221 may be used to adjust amounts of units of consumable upward to correlate with specific patterns of power usage. Further, predictor 246 may transmit data representing a predicted number of tablespoons of ground coffee as consumed unit(s) data 206a to an inventory manager 248.

Inventory manager 248 may be configured to receive data 206a representing a number of consumed units to monitor an amount of inventory of a consumable. Inventory manager 248 may be configured to adjust an amount or value representing an inventory of the consumable responsive to usage of product. For example, inventory manager may adjust an amount of inventory by determining one or more units of a consumable associated with a pattern of electric energy per unit time (e.g., via data 206a), and then reducing the amount of the inventory by the determined units of the consumable to form an adjusted amount of inventory. For example, an inventory of 20 pods of coffee may be reduced to 19 pods of coffee responsive to usage of a coffee machine.

Further, inventory manager 248 may be configured to monitor the amount of inventory against one or more threshold values or one or more ranges of inventory values to determine an action, such as generating a notification or a request for replenishment (e.g., reordering a product). The notification may be one or more of an audio message (e.g., via a smart speaker computing device) or an electronic message that describes a state of inventory for presentation on a display of mobile computing device 290b. As an example, a threshold value may include 105 mg of ground coffee (e.g., 7 days of coffee if 15 mg are brewed per day) or a threshold range may include values from 90 to 130 mg of ground coffee. If inventory manager 248 detects that an adjusted amount of inventory complies (e.g., meets) a threshold value for the inventory, inventory manager 248 may be configured to generate data representing a request to replenish the inventory of the consumable, which may be included in response data 208 of a transmitted electronic message. In one example, response data 208 may be transmitted as an electronic message via a network to a computing system implementing an adaptive distribution platform (not shown). According to various examples, inventory manager 248 may be configured to automatically reorder a consumable to replenish the amount of the inventory.

Note that inventory manager 248 may be programmed or configured to include any number of threshold values. For example, a threshold value to reorder (e.g., automatically reorder) ground coffee may be set to 75 mg (e.g., 5 days of coffee if 15 mg are brewed per day), whereby 75 mg may be described as "a bridging amount," which is an amount that may be a predicted amount to maintain a number of units of the consumable during a time interval (e.g., 5 days) in which the amount of inventory is replenished. In some cases, the bridging amount may be based on nominal durations of time to receive an item via delivery services (e.g., FedEx, etc.) after an order is placed online. Another threshold value may be set to 30 mg (e.g., 2 days of coffee) to alert a user to obtain via "same day" delivery services or inform a user of low inventory so the user may obtain coffee or any other item at a physical location of a retail store.

In some examples, more or fewer components shown in FIG. 2 may be implemented in sensor device 201. For example, sensor device 201 may include 214 for transmitting raw data 280 to mobile computing device 290a, which may include an application 250 (e.g., executable instructions) to implement a correlator 240a and an inventory manager 248a, either of which may have similar structures and/or functionalities as correlator 240 and inventory manager 248 of sensor device 201. Reorder manager 249a includes instructions to cause data 210a representing a replenishment request to be transmitted to, for example, an adaptive distribution platform for purposes of reordering a product near or at depletion. In some examples, sensor device 201 may include characterizer 220 that may transmit characterized data 204b to application 250 stored within mobile computing device 290b. As such, sensor device 201 may omit one or more of characterizer 220, memory 232, radio 234, correlator 240, and inventory manager 248. Any of components of sensor device 201 and mobile computing device 290b may be interchanged or distributed between sensor device 201 and mobile computing device 290, as well as distributed among other devices not shown, including an adaptive distribution platform. For example, reorder manager 249a may be implemented within sensor device 201, and characterizer 220 may be implemented within application 250. One or more components of sensor device 201 may be implemented in logic as either hardware or software, or a combination thereof.

Figure 3:
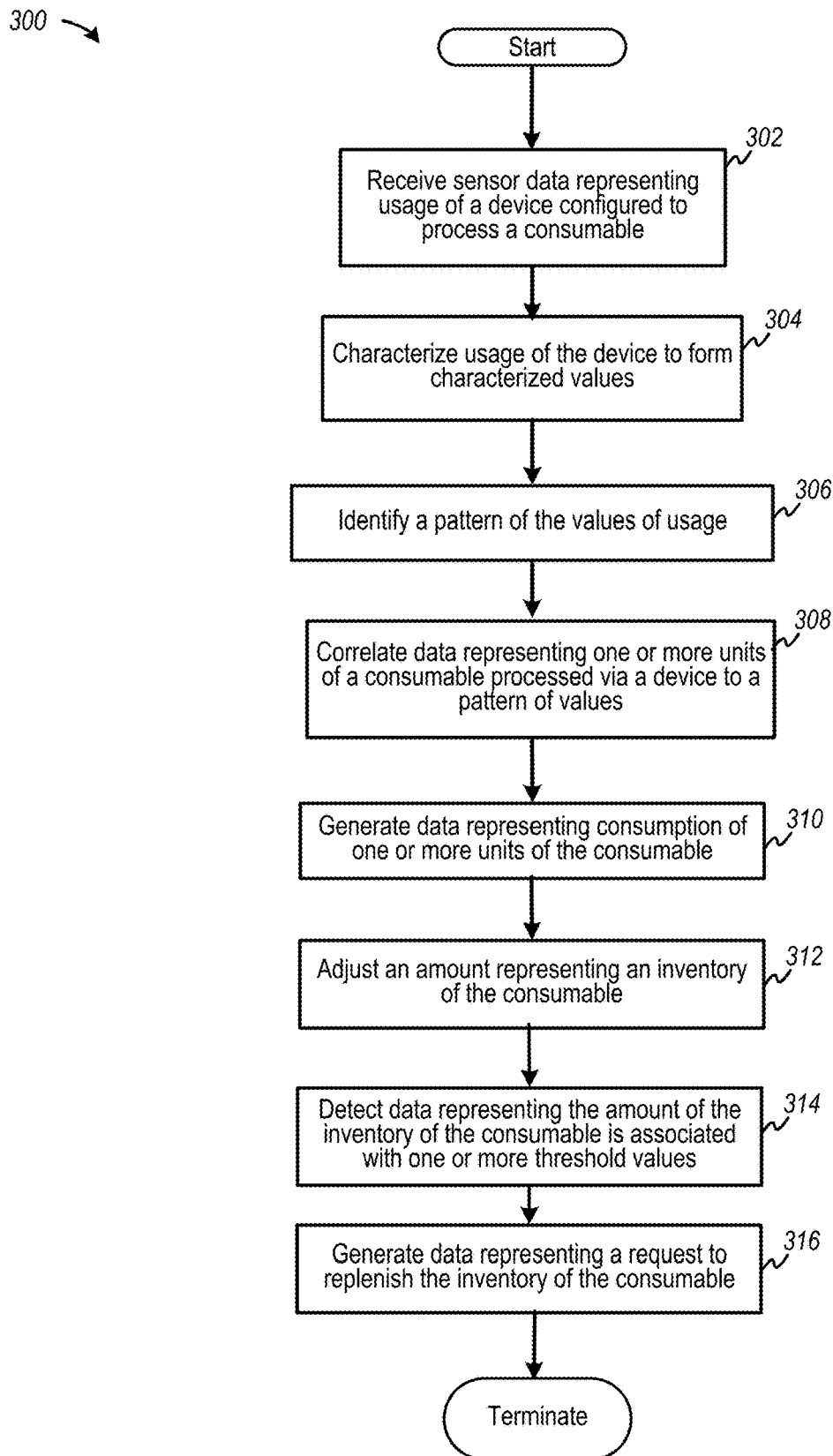
FIG. 3 is flow diagram depicting an example of adjusting inventories of consumable items based on sensor data, according to various examples.

FIG. 3 is flow diagram depicting an example of adjusting inventories of consumable items based on sensor data, according to various examples. At 302 of flow diagram 300, sensor data representing usage may be received. In some examples, sensor data may indicate usage of a device (e.g., an electric-powered device, a mechanical-powered device, a chemical energy-powered device, etc.) configured to process or use a consumable in, for instance, operation of the device. In other examples, sensor data may represent a state of a consumable, such as a weight of an item. Based on a weight of an item, a change in weight may be determined or otherwise calculated to determine a rate or amount of consumption.

In at least one example, other sensor data may describe other states or characteristics of a consumable item, such as a position, an orientation, motion, etc., especially relative to one or more points in time, whereby a change in state indicates usage. A change back to an initial state may indicate usage has stopped. If an estimated rate of consumption is associated with each usage, then an amount of product consumed may be calculated for automatic reordering. Examples of positional or orientation sensor data may include data generating by a "mercury switches, a "tilt switch," a "rolling ball sensor," and the like. In some examples, a wireless position switch coupled to a water faucet (to monitor hand soap usage) or mechanical parts of a toilet (to monitor toilet paper usage) may detect a change in orientation. To illustrate, at time, T1, a faucet handle may change orientation (i.e., water is on), whereas the faucet handle may change orientation back to an initial position at time, T2 (i.e., water is off). The usage of water may be used to predict consumption of hand soap. In one example, a sensor may indirectly sense consumption by detecting and characterizing, for example, an attribute or characteristic of operation of a device, such as the magnitudes and duration of vibrations generated by an electric toothbrush, whereby consumption of toothpaste may be quantified. As such, any sensor that may be configured to measure and track phenomena associated with operation of a machine, appliance or device may be suitable to predict consumption of an associated consumable.

In some examples, sensor data may originate from any source. For example, sensor data representing power consumption or energy expenditure may originate from a "smart appliance," such as a refrigerator, coffee machine, etc. that may have one or more structures and/or functions similar to sensor device 201 of FIG. 2. Therefore, sensor data or other data representing usage or consumption may originate at sensors other than sensor device 201 and may be received wirelessly into logic that may perform one or more function set forth in flow 300 or as described herein.

At 304, usage of a device or a consumable may be characterized to form characterized values that may represent, for example, values of power usage or a weight (or change in weight), according to some examples. At 306, flow 300 may facilitate identification of a pattern of values of usage, such as a pattern of power usage. At 308, data representing one or more units of a consumable (e.g., processed by a device) may be correlated to a pattern of values, such as a pattern of electrical energy consumed by an appliance at a rate per unit time.

At 310, data representing consumption of a portion of a product, such as one or more units of a consumable (e.g., one or more scoops or tablespoons of coffee), may be generated. Based on the use of one or more units of a consumable, an amount of inventory of a consumable may be adjusted (e.g., reduced) at 312. At 314, data representing an amount of inventory may be compared against one or more threshold range of values to detect whether a threshold is met. In response to detecting a threshold value, data representing a request to replenish inventory of the consumable may be generated (e.g., automatically) at 316. Note that one or more of elements 302 to 316 may be optional.

Figure 4:
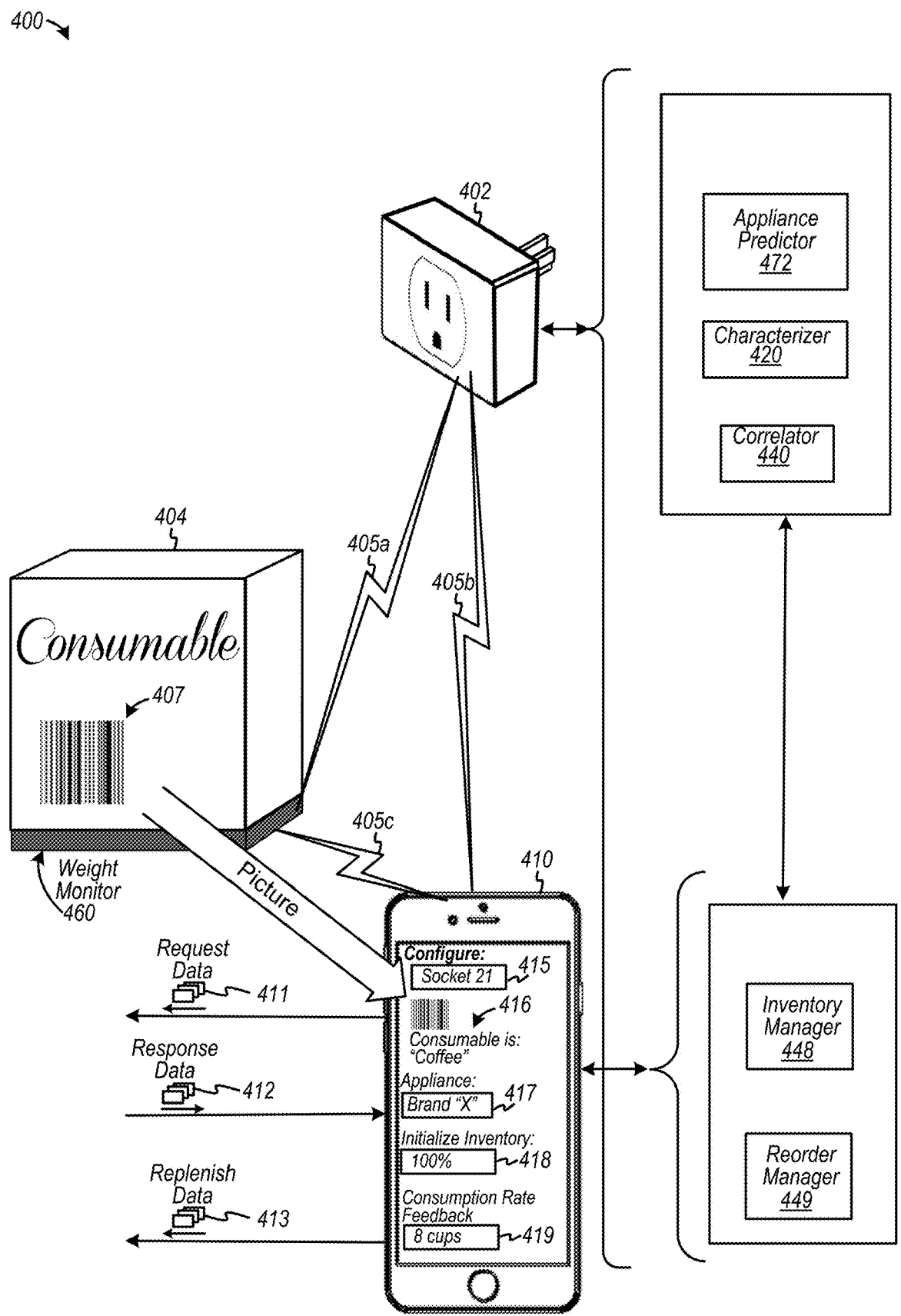
FIG. 4 is a diagram depicting an example of configuring a sensor device to facilitate inventory monitoring of a consumable, according to various examples.

FIG. 4 is a diagram depicting an example of configuring a sensor device to facilitate inventory monitoring of a consumable, according to various examples. Diagram 400 depicts a sensor device 402 configured to monitor power usage, a sensor device ("weight monitor device") 460 to monitor changes in weight of a consumable, which may be optional in this example, and a mobile computing device 410 including an application having executable instructions configured to facilitate inventory monitoring. One or more wireless communication data links 405*a*, 405*b*, and 405*c* may be implemented to exchange data among mobile computing device 410 and sensor devices 402 and 404. A portion 415 of a user interface for mobile computing device 410 may depict a communications link 405*b* is established with "socket 21," which identifies sensor device 402.

In the example shown, an application executing in mobile computing device 410 may capture an image (or picture) of a bar code 407 (or any other coded symbol, such as a product label or code (e.g., UPC) or SKU number). The application may use barcode 407 to transmit an electronic message 411 to request the data, such as an initial weight, quantity, amount, etc., of a purchased product 404 prior to consumption. Further, response data 412 may include a type of product or consumable 404 associated with barcode 407, whereby the consumable type may be displayed in interface portion 416 as "coffee." Therefore, sensor device 402 may be configured to monitor consumption of coffee, and, thus, may predict that power usage is by a coffee or espresso machine. As such, sensed patterns of power usage may be compared against previously-determined or used power usage patterns, such as included in usage signature data. In some cases, sensor device 402 may include logic (e.g., appliance predictor 472) that may be configured to predict a type of appliance or electric-powered device to which sensor device 402 is coupled based on a type of consumable being monitored.

An application executing in association with mobile computing device 410 may also be configured to detect or receive information describing a type or model of an electric-powered device, such as "Brand X" displayed in user input field 417. Optionally, the application may be configured to receive data via input field 418 to describe an initial state of inventory. For example, inventory monitoring and management may begin for a half-used container of coffee by weighing consumable 404 to determine an amount of coffee, which can be set at an initial value of 50% (not shown) in user input field 418. Note that a weight monitor 460 may be used to facilitate inventory management either independent of, or in collaboration with, sensor device 402. In some cases, usage of an electric-powered device or a consumable may be detected based on a signal (e.g., a single signal) indicating a device is "on" or "in use," or whether a jug of milk is picked up. When a jug of milk is displaced, weight monitor 460 may detect a weight of "zero" momentarily, or during the pouring of milk. Based on the signal, a rate of consumption may be set within user input field 419 to predict rates of reducing an inventory per detected use. Alternatively, user input field 419 may be used to provide feedback to the application, sensor device 402, or weight monitor device 460 to recalibrate calculations that determine usage or consumption of a product.

According to some examples, elements depicted in diagram 400 of FIG. 4 may include structures and/or functions as similarly-named or similarly-numbered elements depicted in other drawings. For example, while logic implementing appliance predictor 472, a characterizer 420, and a correlator 440 may be depicted as being within sensor device 402, and logic implementing an inventory manager 448 and a reorder manager 449 may be depicted as being within mobile computing device 410, any of the aforementioned elements or components maybe implemented within either in sensor device 402 or in mobile computing device 410, or may be distributed in any permutation thereof.

Figure 5:
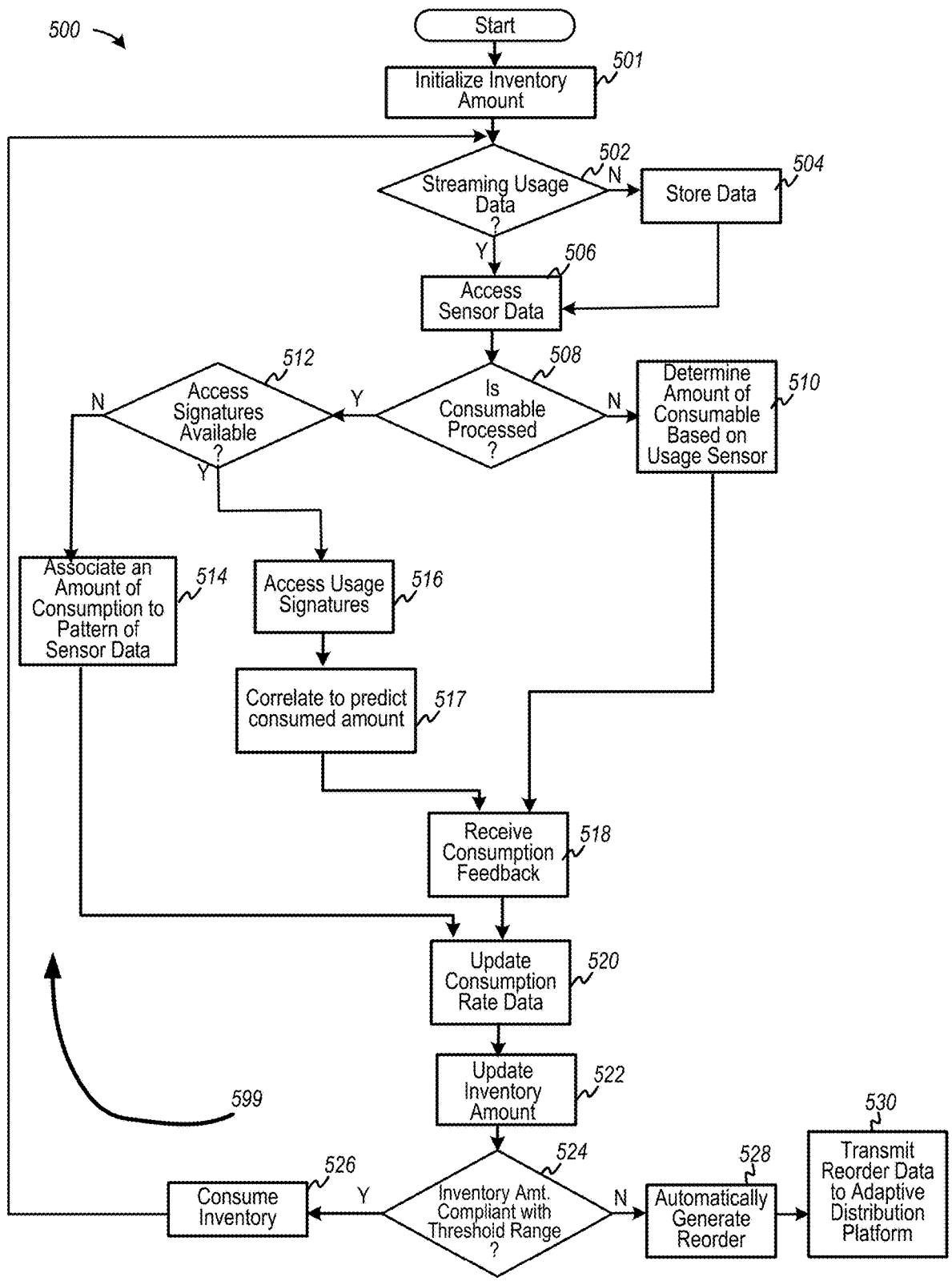
FIG. 5 is a flow diagram depicting application of sensor data to update an amount of inventory for automated replenishment, according to some examples.

FIG. 5 is a flow diagram depicting application of sensor data to update an amount of inventory for automated replenishment, according to some examples. Flow 500 includes 501, at which an amount of inventory (e.g., weight, liquid volume, quantity, etc.) may be initialized to indicate an initial inventory prior to usage. At 502, a determination may be made to identify whether usage data is streamed, for example, via a wireless communication link. If not, usage data may be stored in a memory at 504. Otherwise, flow 500 continues to 506, at which sensor data may be accessed by, for example, a processor in a sensor device or a mobile computing device. At 508, a determination is made whether a consumable is processed, for example, by an electric-powered device. If not, flow 500 moves to 510 at which an amount of a consumable that is used may be determined based on data from a usage sensor. In one example, a usage sensor may include a weight monitoring device. Flow 500 then may proceed to 518.

If a consumable is processed (e.g., by an espresso machine), then flow 500 moves to 512 at which a determination is made whether access to usage signatures is available to access a set of power usage patterns. If yes, then flow 500 moves to 516 at which a usage signature may be accessed to compare against a sensed pattern of power usage by a corresponding electrical appliance. A usage signature may be associated with rate of consumption. Thus, at 517, a pattern of power usage may be correlated to predict a consumed amount of product (e.g., an amount of ground coffee used). Flow 500 then moves to 518.

But if, at 512, a determination is made that a usage signature is not available (e.g., either no pattern may be stored for comparison purposes, or an associated consumption rate or amount corresponding to a pattern may be absent). Flow 500 then may move to 514 at which an amount of consumption may be associated with (e.g., assigned to) to a pattern of power usage. For example, a user may enter an amount of ground coffee used (e.g., 1 pod) to link with a sensed pattern of power usage. Therefore, a correlation between power usage and an amount of product consumed may be "learned" or "predicted" over multiple training cycles, or by implementing deep learning or other artificial intelligence techniques. In some examples, flow 500 may implement a "self-learning" algorithm to, for example, run one or more cycles to train logic to match usage (e.g., watt consumption) to product depletion for an unknown device. Flow 500 then moves to 20.

At 518, feedback regarding a predicted amount of consumption may be received to calibrate subsequent correlations between power usage patterns and amounts of product used. At 520, a rate or amount of consumption per use (e.g., per pattern detection) may be updated to generated updated consumption rate data to enhance accuracy of an amount of consumable used per unit of processing or operation by a device. At 522, an amount of inventory may be updated (e.g., reduced) by an amount consumed, as determined at 520. At 524, a determination is made whether an amount of inventory may be compliant with a range of threshold values. If yes, then inventory is available for consumption at 526. In some examples, as flow 500 passes through loop 599 over multiple occasions, a sensor device may be "trained," through repeated use, to more accurately correlate, and thus predict, power usage to an amount of consumption. If, at 524, a determination is made that an amount of inventory is not compliant with a range of threshold values, flow 500 proceeds to 528, at which a replenishment of a consumable may be automatically reordered. At 530, an electronic message including a request to reorder a consumable may be transmitted to an adaptive distribution platform, according to some examples, whereby the adaptive distribution platform may facilitate fulfillment of a request for replenishment. In some examples, one or more (e.g., all) of the portions of flow 500 may be performed at or with computing devices implementing an adaptive distribution platform.

Figure 6:
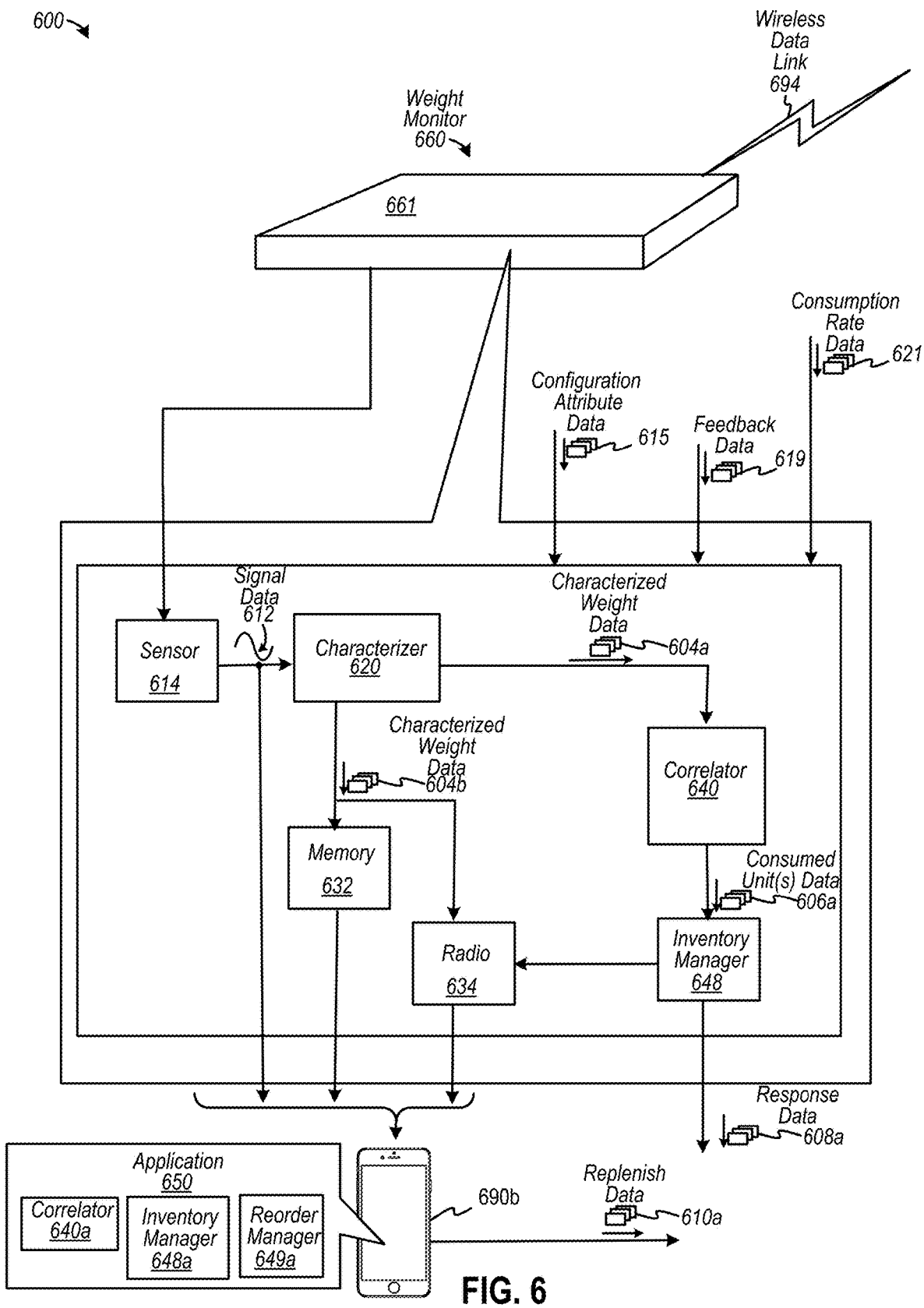
FIG. 6 is a diagram depicting an example of a sensor device configured to detect usage of consumables to generate data for monitoring inventories of consumables, according to various examples

FIG. 6 is a diagram depicting an example of a sensor device configured to detect usage of consumables to generate data for monitoring inventories of consumables, according to various examples. Diagram 600 depicts a sensor device 660 implemented as a weight monitoring device 660, which may include a surface 661 having a surface area configured to receive a consumable, and a weight sensor 614 coupled to surface 661 to detect a weight of a consumable placed thereon. Weight monitoring device 660 may also include a radio to facilitate radio frequency ("RF")-based communications via a wireless data link 694. Diagram 600 further depicts one or more components that may be implemented in weight monitoring device 660 including, but not limited to, a sensor 614, a characterizer 620, a correlator 640, memory 632, a radio 634 and an inventory manager 648. In at least one example, sensor 614 may include a weight sensor implemented as a "load cell" or "transducer." In some examples, a load cell may be configured translate pressure (e.g., one or more forces of compression or tension) into an electrical signal 612, whereby characteristics of electrical signal 612 can be characterized to detect a weight.

According to some examples, characterizer 620 may be configured to generate characterized weight data, such as characterized weight data 604a and characteristic data 604b. Characterizer 620 may translate electrical signal 612 into a value representative of a weight of a consumable set upon surface 661. Hence, characterizer 620 may be configured to characterize usage of a consumable to form a characterized value representing a weight of the consumable (or change in weight). For example, characterizer 620 may be configured to determine a weight of ground coffee is 500 mg as characterized weight data 604a. In at least one example, characterizer 620 may be configured to receive configuration attribute data 612 that may include, for example, a weight of a container that may be implemented to form an inventoriable container (not shown). Thus, configuration attribute data 612 may be used to exclude (e.g., zero-out) the weight of the container from weight monitoring of a consumable, such as coffee. As shown in FIG. 6, data representing a consumption rate ("consumption rate data") 621 may be received into weight monitor 660.

Correlator 640 may receive character as we data 604a to correlate with an amount of product consumed. For example, correlator 640 may reduce a previously-measured weight generated by weight monitoring device 660 (e.g., a weight of coffee when last placed on surface 661 prior to removal for next consumption). Hence, the difference or change in weight of a consumable between a first point of time and a second point may be determined at either characterizer 620 or at correlator 640. Correlator 640 then may be configured to correlate a change in weight to an amount of consumable used, such as an amount of ground coffee used as indicated in data 606a representing one or more units of consumption.

Inventory manager 648 may be configured to adjust a valued representing an amount of an inventory of the consumable to update the inventory. Further, inventory manager 648 may be configured to detect an adjusted amount of the inventory that is associated with a range of threshold values. Upon detecting of a threshold value, data representing a request to replenish the inventory of the consumable may be generated as response data 608a.

Mobile computing device 690a which may include an application 650 (e.g., executable instructions) to implement a correlator 640a and an inventory manager 648a, either of which may have similar structures and/or functionalities as correlator 640 and inventory manager 648 of weight monitoring device 660. Reorder manager 649a may include instructions to cause data 610a representing a replenishment request to be transmitted to, for example, an adaptive distribution platform for purposes of reordering a product near or at depletion. In some examples, weight monitoring device 660 may include characterizer 620 that may transmit characterized weight data 604b to application 650 stored within mobile computing device 690b. As such, weight monitoring device 660 may omit one or more of characterizer 620, memory 632, radio 634, correlator 640, and inventory manager 648. Any of components of weight monitoring device 660 and mobile computing device 690b may be interchanged or distributed between weight monitoring device 660 and mobile computing device 690, as well as distributed among other devices not shown, including an adaptive distribution platform. According to some examples, elements depicted in diagram 600 of FIG. 6 may include structures and/or functions as similarly-named or similarly-numbered elements depicted in other drawings.

Figure 7A:
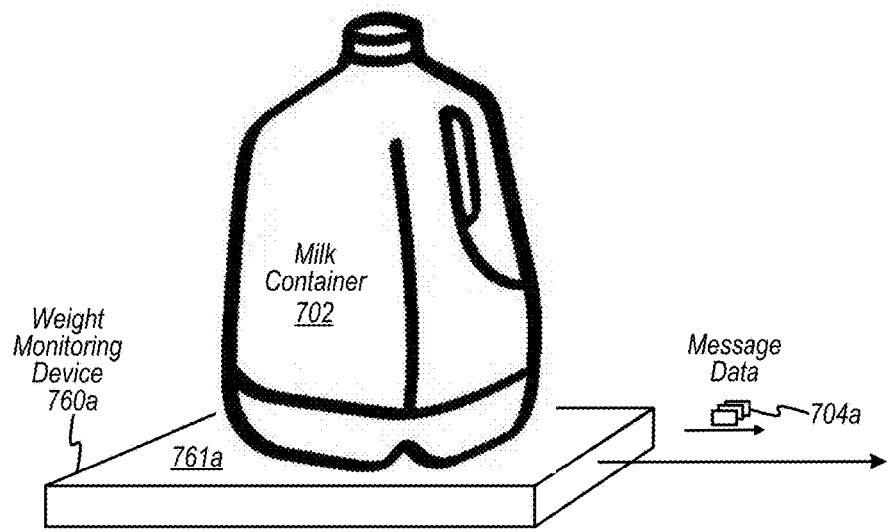
FIGS. 7A and 7B are diagrams depicting examples of weight monitoring device implementations, according to some examples.
Figure 7B:
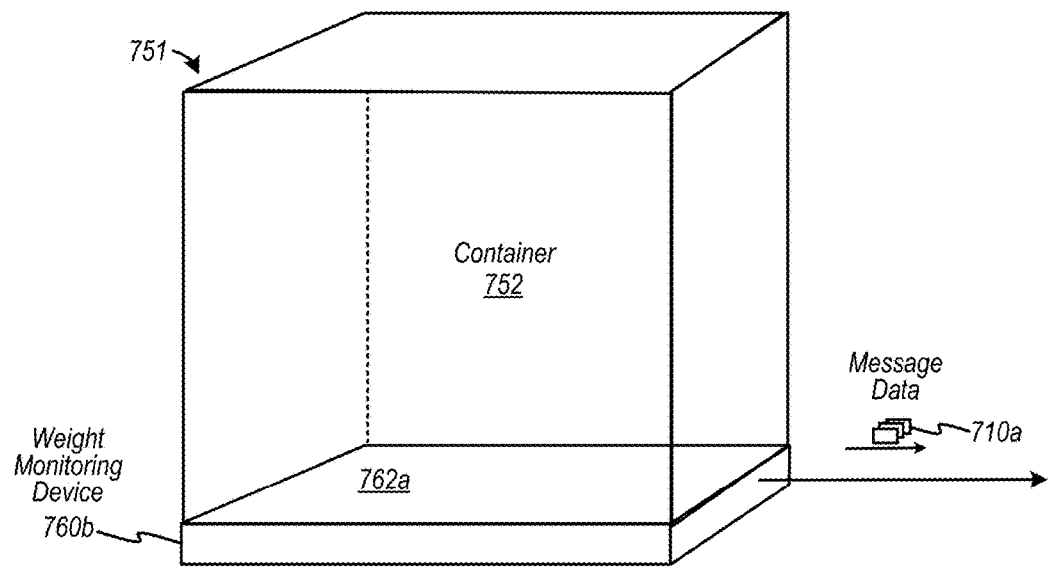

FIGS. 7A and 7B are diagrams depicting examples of weight monitoring device implementations, according to some examples. Diagram of FIG. 7A depicts a weight monitoring device 760a configured to receive, for example, a milk container 702 upon surface 761a, whereby a weight of milk, or changes in a weight in milk, may be transmitted via message data 704a. Weight monitoring device 760a may be configured to operate in relatively cold temperatures within refrigerators. In some examples, logic within weight monitoring device 760a may periodically (or aperiodically) measure a weight of milk (and milk container 702). For example, if detects a "zero" weight, message data 704a may be transmitted to indicate "in use," which may or may not be associated with an approximate consumption rate. In another example, subsequent to weight monitoring device 760a detecting milk container 702 being returned to surface 761a after usage, then weight monitoring device 760a may determine a change in weight correlatable to an amount of milk consumed. This change in weight may be transmitted via electronic message data 704a. According to some examples, weight monitoring device 760a may monitor changes in milk weight against a threshold value to determine a time at which to reorder or replenish milk. Weight manager device 760a may be used to monitor weight of any solid or liquid item.

Diagram of FIG. 7B depicts a weight monitoring device 760b attached to (e.g., using adhesive) or otherwise integrated with a container 752 to form an inventoriable container 751. In operation, container 752 may be filled with liquids or solids, such as cereal. In some examples, logic within weight monitoring device 760b may determine a change in weight correlatable to an amount of cereal consumed. This change in weight may be transmitted via electronic message data 704b. According to some examples, weight monitoring device 760b may monitor changes in cereal weight against a threshold value to determine a time at which to reorder or replenish cereal. Weight manager device 760b of inventoriable container 751 may be used to monitor weight of any solid or liquid item. In some examples, inventoriable container 751 may include an orientation sensor (not shown) that detects when container 752 is "tipped" to allow contents to pour out, whereby the change in orientation may be associated with usage. According to some examples, elements depicted in diagrams 700 and 750 of respective FIGS. 7A and 7B may include structures and/or functions as similarly-named or similarly-numbered elements depicted in other drawings.

Figure 8:
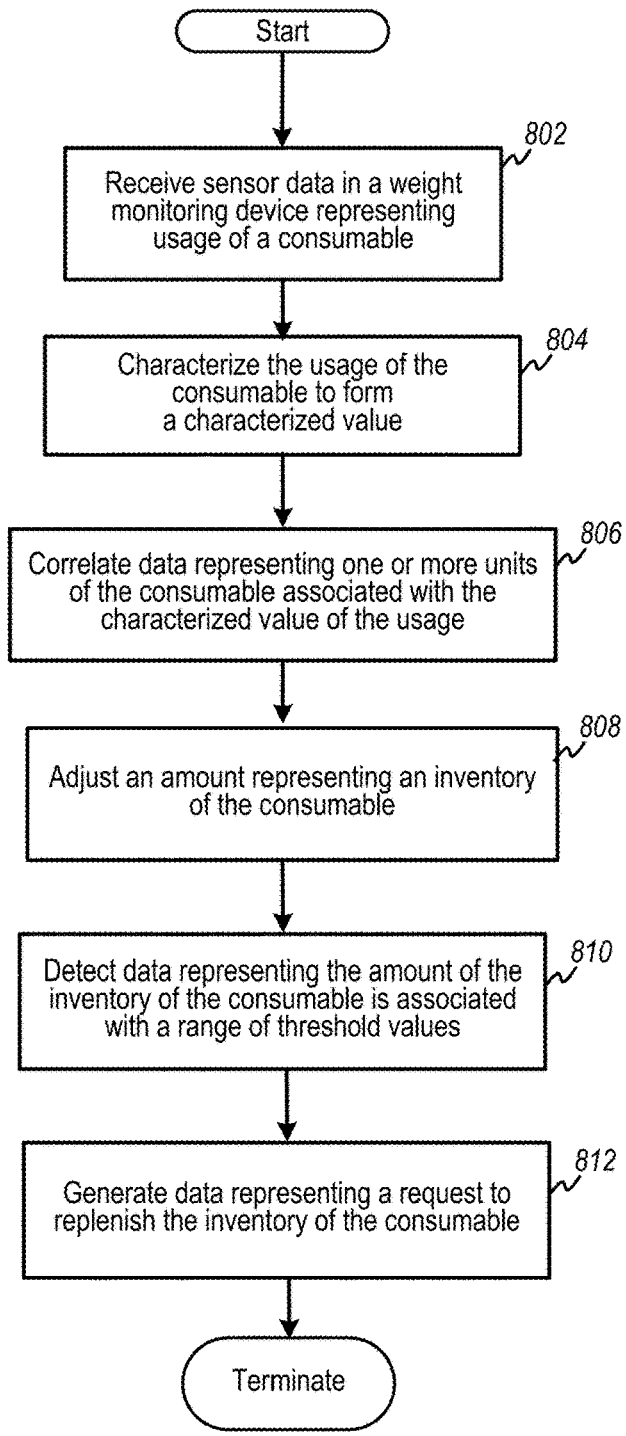
FIG. 8 is a flow diagram depicting an example of monitoring inventory of a consumable using a weight monitoring device to determine a time at which to replenish an inventory, according to some examples.

FIG. 8 is a flow diagram depicting an example of monitoring inventory of a consumable using a weight monitoring device to determine a time at which to replenish an inventory, according to some examples. Flow 800 begins at 802, at which sensor data (e.g., load cell-derived data) in a weight monitoring device may be received. The sensor data may represent a usage of a consumable. At 804, usage of a consumable may be characterized to form a characterized value. For example, electric signals from a load cell (or any other sensor) may be characterized so as to determine a weight of a consumable. At 806, data representing one or more units of a consumable (associated with the characterized value) may be correlated to a usage, whereby the usage may be described as a value representing a differential or a change in weight. At 808, an amount representing an inventory of a consumable may be adjusted (e.g., reduced) to update an amount of inventory. At 810, data representing an amount of the inventory that is associated with one or more threshold values, or a range of threshold values, may be detected. Subsequent to the detection, electronic message may be generated at 812 to include data representing a request to replenish the inventory of the consumable.

Figure 9:
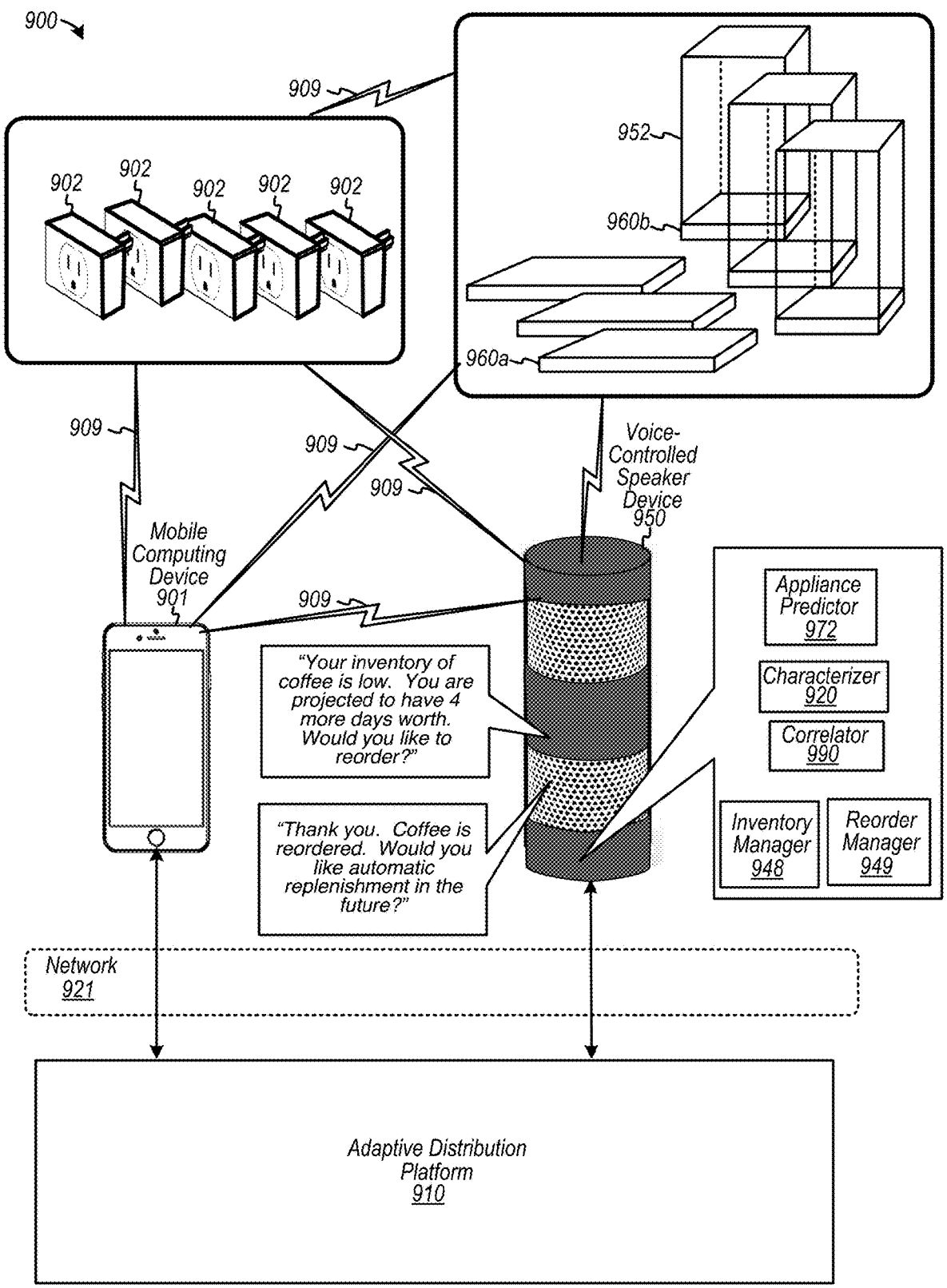
FIG. 9 is a diagram depicting a home inventory monitoring network including a variety of sensors coupled to one or more computing devices to monitor inventories of consumables and to facilitate replenishment of consumables, according to various examples.

FIG. 9 is a diagram depicting a home inventory monitoring network including a variety of sensors coupled to one or more computing devices to monitor inventories of consumables and to facilitate replenishment of consumables, according to various examples. Diagram 900 depicts a set of sensor devices 902 each of which may be independently or individually linked via a home network including data links 909. In this example, sensor data 902 each may be configured or adapted to sense power usage by a corresponding electric-powered device. Further, diagram 900 depicts sets of weight monitoring devices 960a and inventoriable containers 952 that include weight monitoring devices 960b. Weight monitoring devices 960a and 960b may each be independently or individually linked via a home network that includes data links 909.

Diagram 900 also shows sensor devices 902 linked to weight monitoring devices 960a and 960b, as well as to one or more computing devices, such as a mobile computing device 901 and a voice-controlled speaker device 950. Voice-controlled speaker device 950, or "smart" speaker computing device, may include logic, such as an appliance predictor 972, a characterizer 920, a correlator 990, and inventory manager 948, and a reorder manager 949. According to some examples, elements depicted in diagram 900 FIG. 9 may include structures and/or functions as similarly-named or similarly-numbered elements depicted in other drawings.

Accordingly, voice-controlled speaker device 950 may monitor whether any one of a number of consumable inventories reach a threshold value (e.g., a notification limit). If a consumable is detected to have a quantity or an amount of inventory that matches a threshold value, voice-controlled speaker device 950 may generate an audio notification: "your inventory of coffee is low. You are projected to have 4 more days' worth. Would you like to reorder?" Should a user reply with "yes," then voice-controlled speaker device 950 may be configured to perform other actions. For example, voice-controlled speaker device 950 may request whether to automatically reorder a consumable in the future. As such, voice-controlled speaker device 950 may generate an audio request: "Thank you. Coffee is reordered. Would you like automatic replenishment in the future?" Should the user reply verbally, such as "yes," then reorder manager 949 may include logic to cause automatic reordering of a consumable upon an inventory amount reaching a certain threshold value.

According to various examples, voice-controlled speaker device 950 may include any other logic to facilitate monitoring of consumables at a remote location. In some examples, mobile computing device 901 and voice-controlled speaker device 950 may exchange electronic messages via network 921 to coordinate reordering of consumables through one or more computing devices implementing adaptive distribution platform 910. In one example, voice-controlled speaker device 950 may incorporate specialized logic into, for example, an Amazon Echo™ speaker device of Amazon.com, Inc., of Seattle, Wash., U.S.A.

Figure 10:
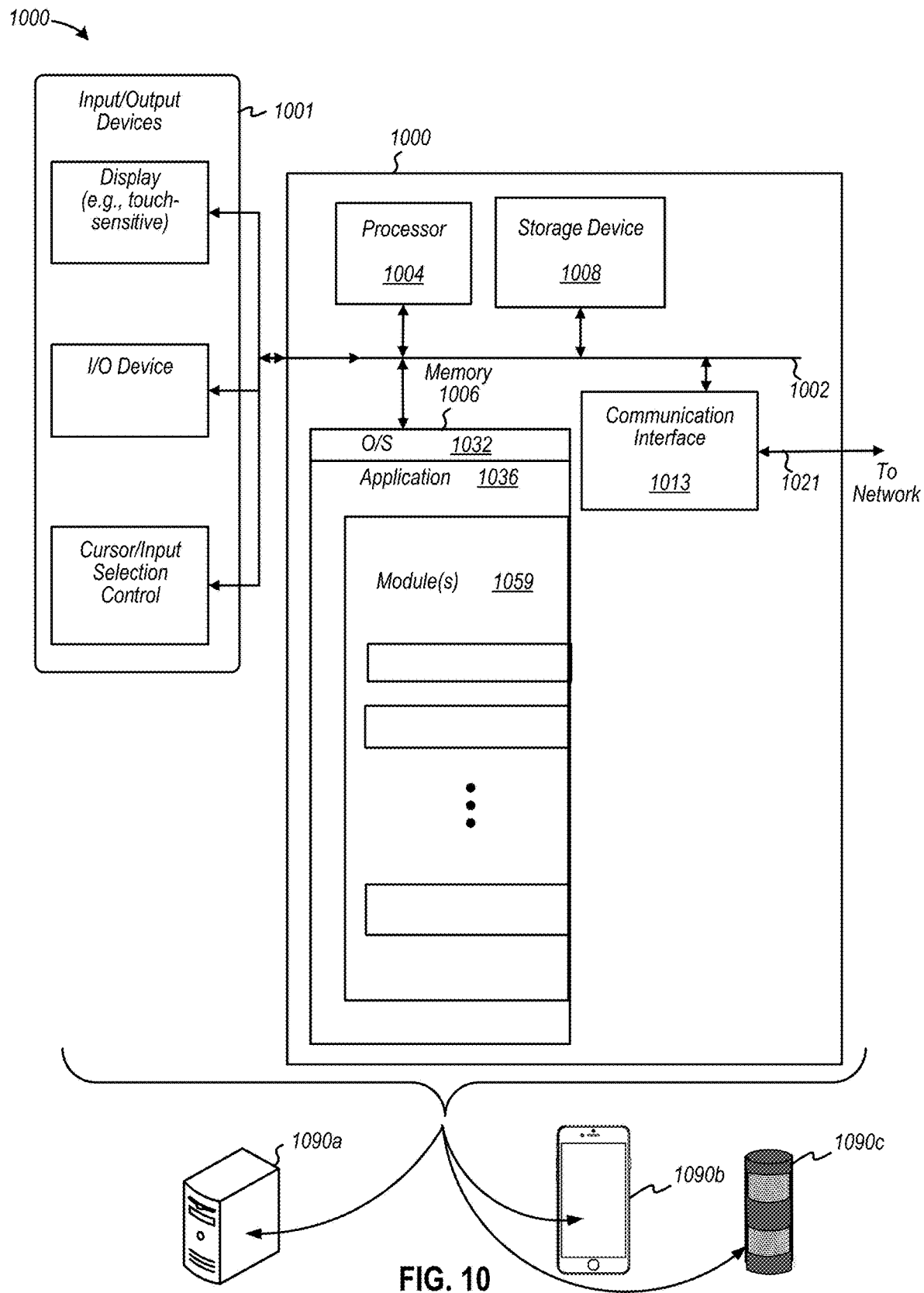
FIG. 10 illustrates examples of various computing platforms configured to provide various functionalities to monitor an inventory of a consumable to facilitate automated distribution and replenishment of an item, according to various embodiments.

FIG. 10 illustrates examples of various computing platforms configured to provide various functionalities to monitor an inventory of a consumable to facilitate automated distribution and replenishment of an item, according to various embodiments. In some examples, computing platform 1000 may be used to implement computer programs, applications, methods, processes, algorithms, or other software, as well as any hardware implementation thereof, to perform the above-described techniques.

In some cases, computing platform 1000 or any portion (e.g., any structural or functional portion) can be disposed in any device, such as a computing device 1090a, mobile computing device 1090b, a voice-controlled speaker device 1090c, and/or a processing circuit in association with implementing any of the various examples described herein.

Computing platform 1000 includes a bus 1002 or other communication mechanism for communicating information, which interconnects subsystems and devices, such as processor 1004, system memory 1006 (e.g., RAM, etc.), storage device 1008 (e.g., ROM, etc.), an in-memory cache (which may be implemented in RAM 1006 or other portions of computing platform 1000), a communication interface 1013 (e.g., an Ethernet or wireless controller, a Bluetooth controller, NFC logic, etc.) to facilitate communications via a port on communication link 1021 to communicate, for example, with a computing device, including mobile computing and/or communication devices with processors, including database devices (e.g., storage devices configured to store any types of data, etc.). Processor 1004 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 1000 exchanges data representing inputs and outputs via input-and-output devices 1001, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 1001 may be implemented as, or otherwise substituted with, a user interface or a voice-controlled interface in a computing device in accordance with the various examples described herein.

According to some examples, computing platform 1000 performs specific operations by processor 1004 executing one or more sequences of one or more instructions stored in system memory 1006, and computing platform 1000 can be implemented in a client-server arrangement, peer-to-peer arrangement, or as any mobile computing device, including smart phones and the like. Such instructions or data may be read into system memory 1006 from another computer readable medium, such as storage device 1008. In some examples, hard-wired circuitry may be used in place of or in combination with software instructions for implementation. Instructions may be embedded in software or firmware. The term "computer readable medium" refers to any tangible medium that participates in providing instructions to processor 1004 for execution. Such a medium may take many forms, including but not limited to, non-volatile media and volatile media. Non-volatile media includes, for example, optical or magnetic disks and the like. Volatile media includes dynamic memory, such as system memory 1006.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1002 for transmitting a computer data signal.

In some examples, execution of the sequences of instructions may be performed by computing platform 1000. According to some examples, computing platform 1000 can be coupled by communication link 1021 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 1000 may transmit and receive messages, data, and instructions, including program code (e.g., application code) through communication link 1021 and communication interface 1013. Received program code may be executed by processor 1004 as it is received, and/or stored in memory 1006 or other non-volatile storage for later execution.

In the example shown, system memory 1006 can include various modules that include executable instructions to implement functionalities described herein. System memory 1006 may include an operating system ("O/S") 1032, as well as an application 1036 and/or logic module(s) 1059. One or more logic modules 1059 may each be configured to perform at least one function as described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 1059 of FIG. 10, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 1059 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 1059 of FIG. 10 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, modules 1059 of FIG. 10, or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

FIGS. 11A to 11E are diagrams each depicting an example of a sub-flow that may be interrelated to other sub-flows to illustrate a composite flow, according to some examples. Sub-flow 1100 begins at 1102a at which a device may be coupled to a usage sensing device, such as a sensor device configured to sense power usage, a weight monitoring device, or other in-situ sensing devices. At 1104a, a user (e.g., consumer) may provide shipping and payment information, both of which may be stored in a memory within a data arrangement constituting a user account. At 1106a, a computing device may be configured to prompt a user to select a device, for example, from a list of existing or relevant devices (e.g., stored in a database). At 1108a, a determination is made as to whether an inventory monitoring system includes an indicator that data associated with a device exists in the system (e.g., within a database in the system). Note that portions of the system may be distributed in an adaptive distribution platform or within any other computing device. If no, then sub-flow 1100 moves to 1110a at which data representing attributes of a device may be added. At 1112a, a computing device may prompt a user or consumer to run a device through each operation that may consume a consumable. From here, sub-flow 1100 moves to a sub-flow 1101 at "A" of FIG. 11B.

Figure 11A:
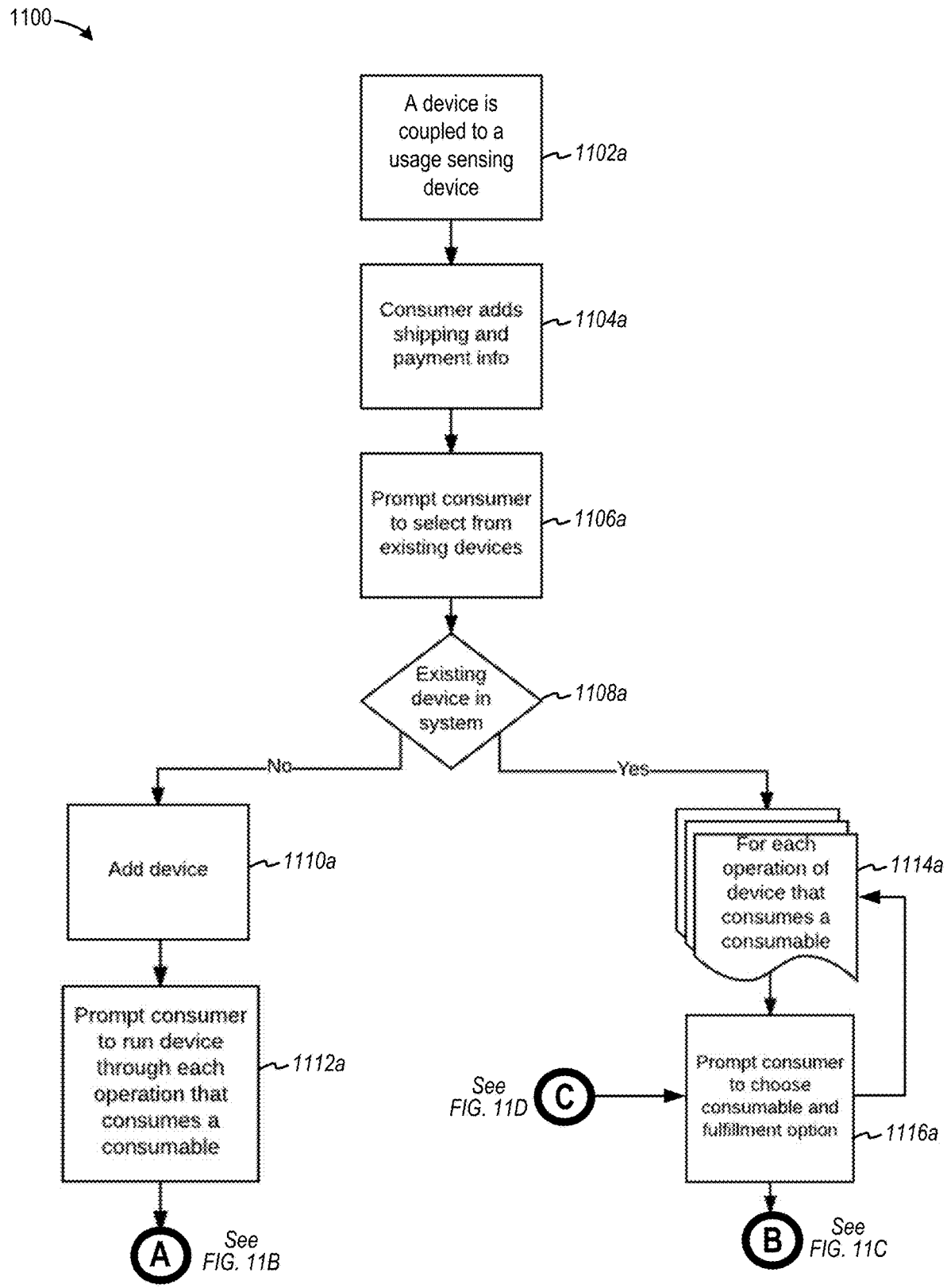
FIGS. 11A to 11E are diagrams each depicting an example of a sub-flow that may be interrelated to other sub-flows to illustrate a composite flow, according to some examples.
Figure 11B:
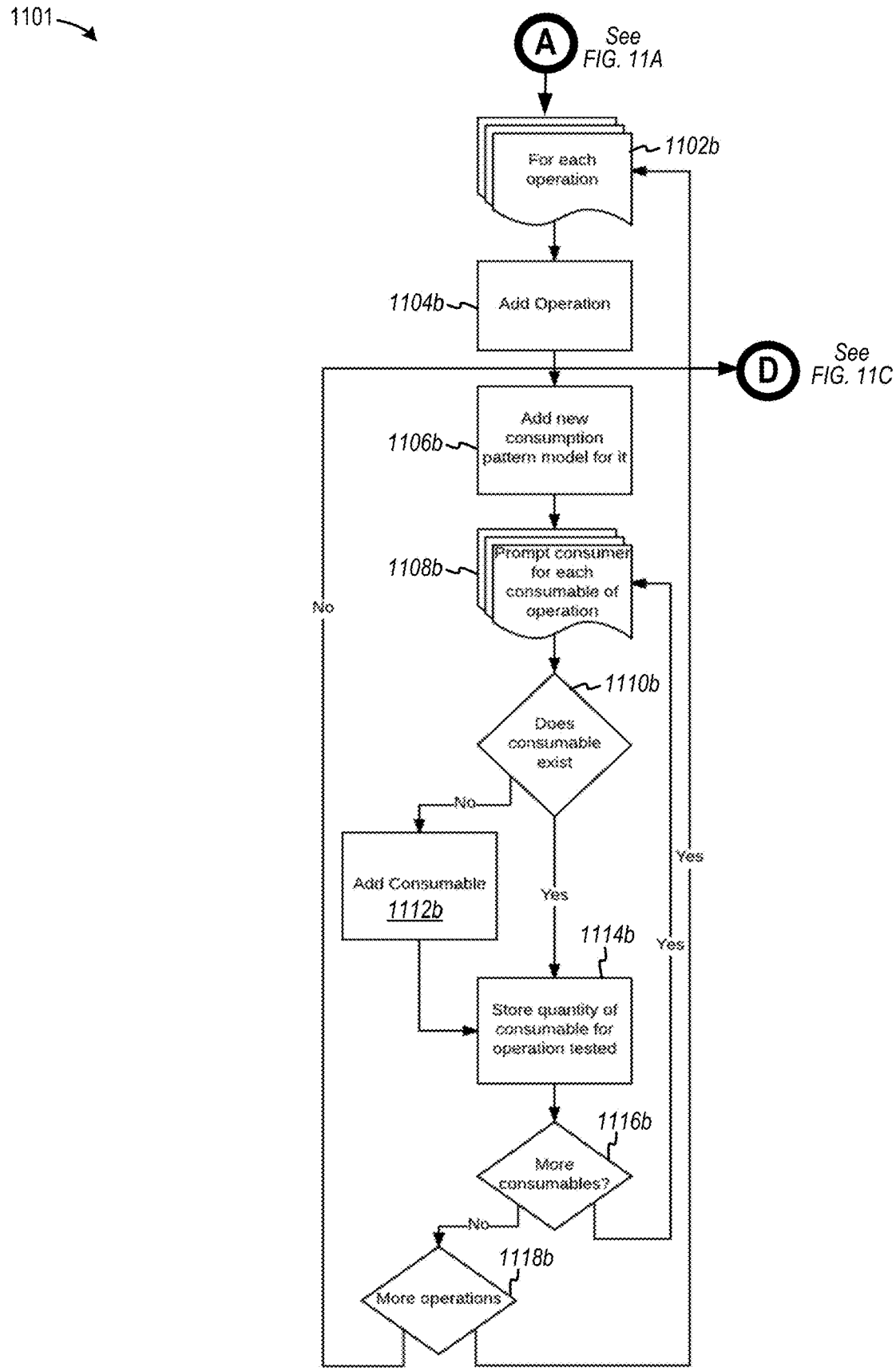

Referring to FIG. 11B, sub-flow 1101 begins at 1102b, whereby elements of sub-flow 1101 may be repeated for each operation of interest for a device. An operation may relate to a specific processing of a consumable by a device, according to some examples. At 1104b, an operation of a device may be added, whereby a consumption pattern model (e.g. a new consumption pattern mode) may be added for the device at 1106b. At 1108b, a computing device may be configured to execute instructions to prompt (e.g., repeatedly prompt) a user to identify one or more consumables of an operation. At 1110b, a determination is made as to whether a consumable exists within a database or other data arrangement of the system. If not, data identifying and describing a consumable may be added at 1112b. Otherwise, sub-flow 1101 moves to 1114b, at which a quantity of a consumable may be stored for an operation performed or tested. At 1116b, a determination is made as to whether a specific operation may use other consumables. If yes, then sub-flow 1101 proceeds back to 1108b until a determination is made subsequently at 1116b that there are no more consumables. In this case, sub-flow 1101 moves to 1118b, at which a determination is made whether there are any more operations in which consumables may be identified. If yes, then sub-flow 1101 moves back to 1102b. Otherwise, sub-flow 1101 proceeds to sub-flow 1102 at "D" of FIG. 11C.

Figure 11C:
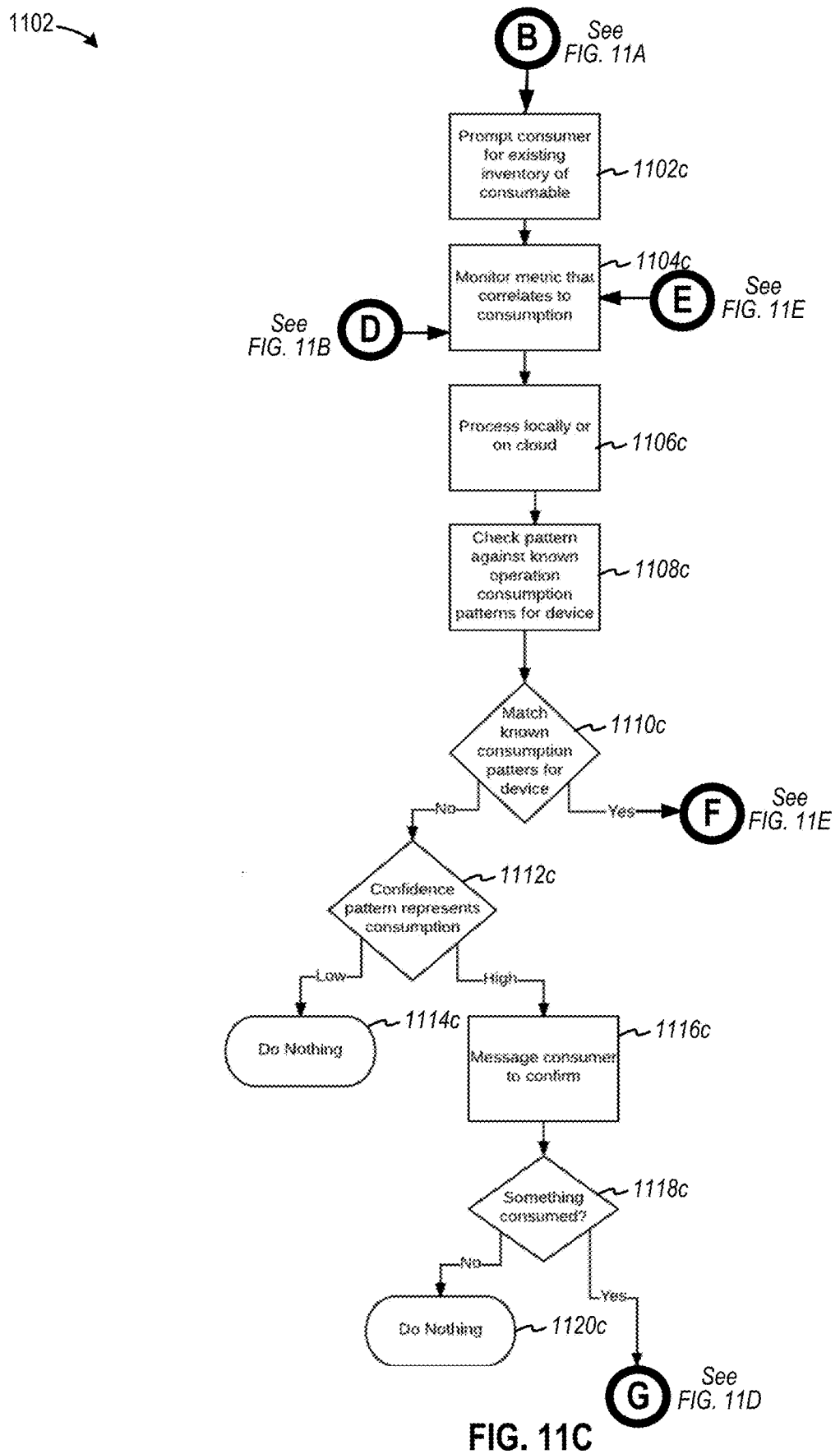

Referring to FIG. 11C, sub-flow 1102 begins from "D" of FIG. 11B at 1104c, at which a metric, characteristic, attribute, or parameter that correlates to consumption may be monitored. Sub-flow 1102 flows to 1106c, at which a correlation may be performed locally (e.g., at a sensor device, a mobile computing device, or any other computing device) or at a remote computing system platform (e.g., in the "cloud"), such an adaptive distribution platform and/or a platform provided by OrderGroove, Inc., of New York, N.Y., U.S.A. At 1108c, a pattern is checked or matched against known operation consumption patterns for a device. Examples of known operation consumption patterns may include usage signature data, according to some implementations. At 1110c, a determination is made to detect whether a known consumption pattern for a device matches a sensed pattern. If yes, sub-flow 1102 may proceed to sub-flow 1104 of FIG. 11E at "F."

Figure 11D:
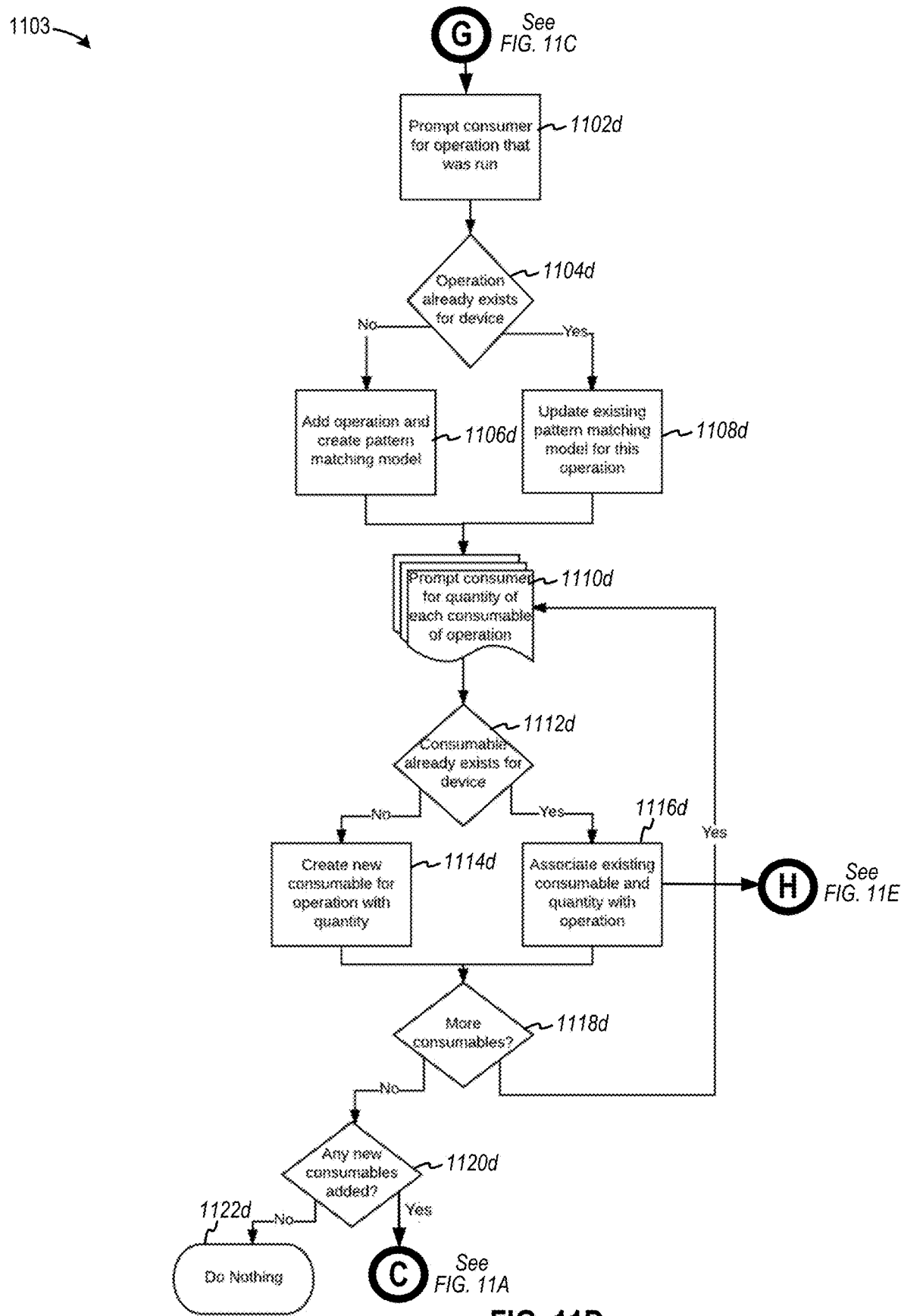
Figure 11E:
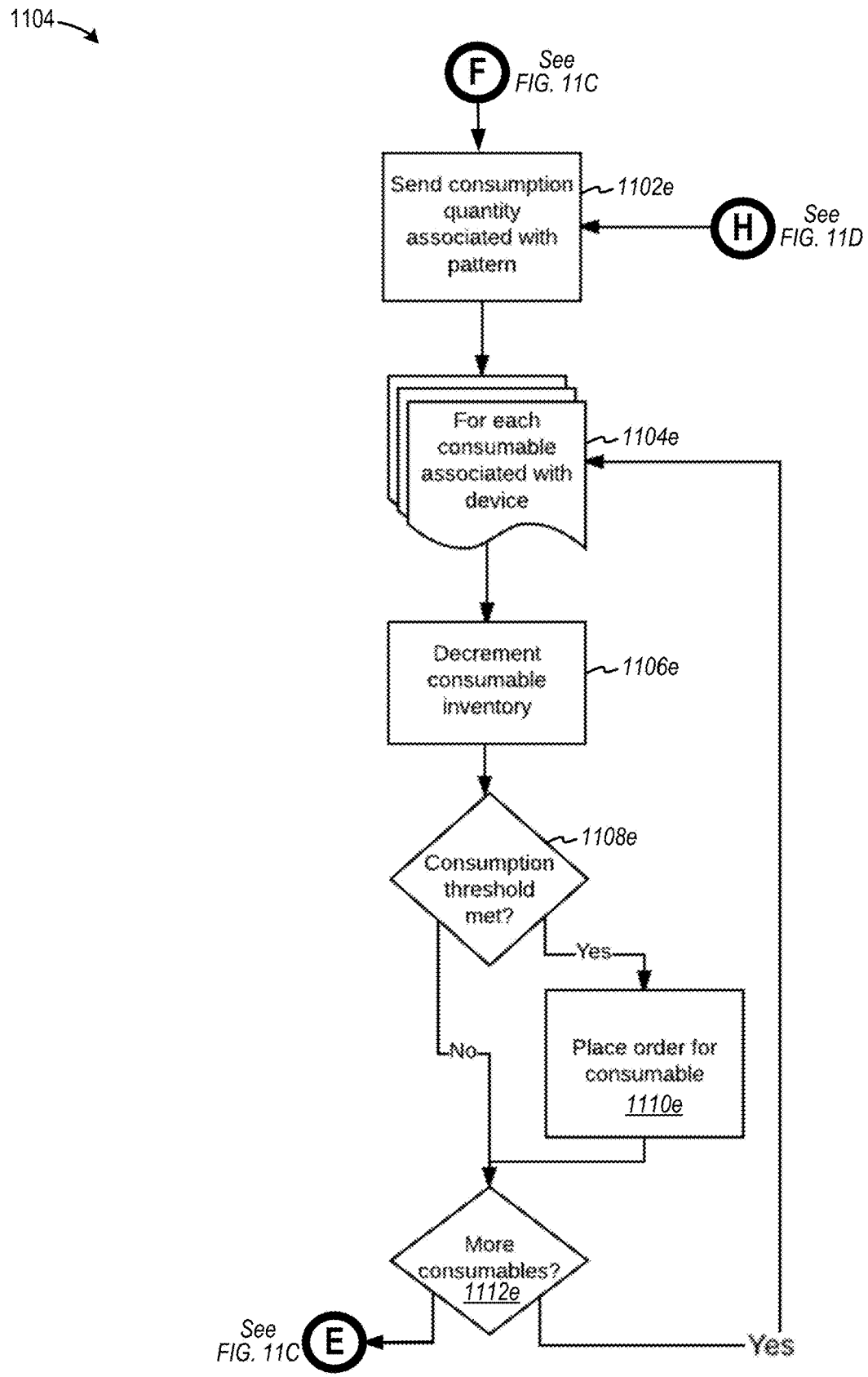

Referring to FIG. 11E, sub-flow 1104 begins from "F" of FIG. 11C at 1102e, at which a consumption quantity associated with a pattern may be sent or otherwise identified. At 1104e, for each consumable associated with a device, an inventory amount for a consumable may be adjusted. At 1106e, inventory for a consumable may be decremented by a consumed amount. At 1108e, a determination is made as to whether a consumption threshold is met to replenish inventory for a specific consumable. If yes, then an order may be placed for a consumable at 1110e. In some cases, the order is automatically placed. Otherwise, sub-flow 1104 moves to 1112e, at which a determination is made as to whether inventories of other consumables may be adjusted. If yes, sub-flow 1104 moves based to 1104e, which may be implemented for each consumable. Otherwise, sub-flow 1104 may proceed back to sub-flow 1102 of FIG. 11C at "E."

Referring back to FIG. 11C, sub-flow 1102 begins from "E" of FIG. 11E at 1104c, whereby sub-flow 1102 may proceed as previously discussed up through to 1110c. In this flow, however, consider that at 1110c, a determination may be made that there is no known consumption patterns for a device that matches, for example, a sensed pattern. Thus, sub-flow 1102 proceeds to 1112c, at which a determination is made to identify whether a probability or confidence indicates that a sensed pattern represents consumption. If confidence or a probability is low, then nothing need be performed at 1114c. Otherwise, if confidence or a probability is relatively high, then an electronic message may be generated for transmission to a user to request feedback at 1116c to confirm whether a consumable had been consumed. At 1118c, a determination may be made whether something had been consumed responsive to request for feedback. If nothing had been consumed, then nothing need be performed at 1114c. Otherwise, sub-flow 1102 progresses to "G" of sub-flow 1103 of FIG. 11D.

Referring to FIG. 11D, sub-flow 1103 begins from "G" of FIG. 11C at 1102d, at which executable instructions performed on a computing device may prompt a user for an operation that was run in relation to a device, such as a coffee maker. At 1104*d*, a determination is made whether an operation and associate descriptive data are stored (e.g., exists) in a database for a device. If no, an operation is added at 1106*d* and a pattern matching model may be created. If yes, an existing pattern matching model may be updated for an operation at 1108*d*. At 1110*d*, executable instructions performed on a computing device may prompt a user to provide a quantity that is used for each consumable of an operation. At 1112*d*, a determination may be made as to whether a consumable already exists or is stored for device consumable for an operation may be created at 1114*d* along with an associated to a quantity of product consumed in the operation. Otherwise, an existing consumable and quantity may be associated at 1116*d* with an operation of a device. In some cases, sub-flow 1103 may proceed from 1116*d* to "H" of sub-flow 1104 of FIG. 11E.

Referring back to sub-flow 1103, a determination may be made at 1118*d* as to whether any more consumables for an operation (e.g., processing of a consumable) may be considered. If yes, sub-flow 1103 may return to 1110*d*, otherwise sub-flow 1103 may move to 1120*d*. At 1120*d*, a determination is made as to whether any new consumables may be added. If no, then nothing need be performed at 1122*d*. If yes, sub-flow 1103 may proceed to "C" of sub-flow 1100 in FIG. 11A.

Referring to FIG. 11A, sub-flow 1100 begins from "C" of FIG. 11D at 1116*a*, at which executable instructions performed on a computing device may prompt a user to choose a consumable and fulfillment option (e.g., one or more ways to select a product and select a way to facilitate that a consumable may be reordered). Note that, 1116*a* may be obtained if a determination at 1108*a* indicates "yes" that a device (and associated descriptive data) under consideration exists in a system database. At 1114*a*, executable instructions performed at 1116*a* on a computing device for each operation of a device that consumes a consumable. From 1116*a*, sub-flow 1100 may proceed to at "B" of sub-flow 1102 in FIG. 11C. Referring back to FIG. 11C, sub-flow 1102 begins from "B" of FIG. 11A at 1102*c*, at which executable instructions performed on a computing device may prompt a user for an existing inventory (e.g., amount) of a consumable as an initial amount. Thereafter, sub-flow 1102 may be performed as previously described above, thereby continuing a flow through sub-flows in FIGS. 11A to 11E, according to some examples.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. An apparatus comprising:
a surface including a surface area configure to receive a consumable associated with a housing, the housing including:
a weight sensor coupled to the surface, the weight sensor including a load cell;
a radio configured to exchange electronic messages including data representing consumption of one or more units of the consumable, the radio is further configured to receive data from a collaborative sensor that is configured to determine power usage;
a memory including executable instructions; and
a processor, responsive to executing the instructions, is configured to:
receive data from the weight sensor representing usage of the consumable;
characterize a value of weight of the consumable at a point in time based on the received data from the weight sensor;
correlate a change of the value of weight to data representing the one or more units of the consumable determined based on a characterized value of the determined power usage;
generate the data representing consumption of the one or more units of the consumable based on the correlated change;
adjust an amount representing an inventory of the consumable based on the consumption;
detect data representing the amount of the inventory of the consumable is associated with one or more threshold values;
generate data representing a request to replenish the inventory of the consumable when the amount of the inventory falls below the one or more threshold values; and
automatically reorder the consumable to replenish the amount of the inventory.

2. The apparatus of claim 1, wherein the housing further includes:
an orientation sensor configured to detect a change in orientation to determine the usage of the consumable.

3. The apparatus of claim 2, wherein the orientation sensor comprises:
one or more of a mercury switch, a tilt switch, and a rolling ball sensor.

4. The apparatus of claim 1, wherein the processor is further configured to execute instructions to:
transmit the data representing the consumption of the one or more units of the consumable to a computing device.

5. The apparatus of claim 4, wherein the computing device implements one or more of an adaptive distribution platform, a mobile computing device, and a smart speaker device configured to implement voice-controlled commands to reorder the consumable to replenish the inventory.

6. A method comprising:
receiving sensor data in a weight monitoring device representing usage of a consumable, the weight monitoring device including a housing and a processor in the housing, the weight monitoring device implementing a load cell;
exchanging, via a radio disposed in the housing, electronic messages including data representing consumption of one or more units of the consumable, the radio configured to receive data from a collaborative sensor that is configured to indicate power usage;
characterizing, by the processor in the housing, the usage of the consumable to form a characterized value representing a value of weight of the consumable;
correlating, by the processor in the housing, data representing one or more units of the consumable determined based on a characterized value of the power usage associated with the value of the weight of the consumable;
generating, by the processor in the housing, the data representing consumption of the one or more units of the consumable based on the correlation;
adjusting, by the processor in the housing an amount representing an inventory of the consumable based on the consumption;

detecting, by the processor in the housing, data representing the amount of the inventory of the consumable is associated with a range of threshold values;

generating, by the processor in the housing, data representing a request to replenish the inventory of the consumable when the amount of the inventory falls below the range of threshold values; and automatically reordering, by the processor in the housing, the consumable to replenish the amount of the inventory.

7. The method of claim 6 wherein receiving the sensor data representing the usage of the consumable comprises:

receiving data representing a value of weight of the consumable at a point in time.

8. The method of claim 6 wherein receiving the sensor data representing the usage of the consumable comprises:

detecting a reduction of weight.

9. The method of claim 6 wherein receiving the sensor data representing the usage of the consumable comprises:

detecting, by the processor in the housing, a change in orientation of the weight monitoring device.

10. The method of claim 6 wherein characterizing the usage of the consumable comprises:

determining a change in the weight of the consumable.

11. The method of claim 6 wherein characterizing the usage of the consumable comprises:

determining a change in the weight of the consumable;

accessing data representing a consumption rate; and predicting an amount of the consumable that is consumed.

12. The method of claim 6 wherein correlating the one or more units of the consumable to the characterized value comprises:

identifying a value of weight representing a change in a weight of the consumable;

identifying a unit of consumption for a unit of weight; and converting the change in the value of weight of the consumable to a consumed amount.

13. The method of claim 12 wherein identifying the value of weight representing the change in the weight comprises:

determining a first value of weight at a first time point;

determining a second value of weight at a second time point; and computing a difference of values of weight to form the value of weight.

14. The method of claim 6 wherein adjusting the amount representing the inventory of the consumable comprises:

determining the one or more units of the consumable associated with a change in the weight of the consumable;

reducing the amount of the inventory of the consumable by the one or more units of the consumable to form an adjusted amount of inventory; and comparing the adjusted amount of inventory to determine whether a threshold value of inventory is detectable.

15. The method of claim 14 further comprising:

detecting the adjusted amount of inventory complies with the threshold value of the inventory;

generating an electronic message including data representing the request to replenish the inventory; and transmitting the electronic message via a network to a computing system implementing an adaptive distribution platform.

16. The method of claim 14 wherein the threshold value of the inventory is a bridging amount, wherein the bridging amount is a predicted amount to maintain a number of units of the consumable during a time interval in which the amount of inventory is replenished.

17. The method of claim 14 further comprising:

detecting the adjusted amount of inventory complies with a threshold value of the inventory; and generating a notification that the amount of the inventory is reduced to a predetermined amount.

18. The method of claim 17 wherein the notification is one or more of an audio message and an electronic message that describes a state of the inventory.

\* \* \* \* \*